US008292714B2

(12) United States Patent
Kennedy

(10) Patent No.: US 8,292,714 B2

(45) Date of Patent: Oct. 23, 2012

(54) METHOD OF AND APPARATUS FOR PLAYING A CARD GAME

(75) Inventor: Julian J. Kennedy, Longs, SC (US)

(73) Assignee: Vegas Amusement, Inc., Mountain Rest, SC (US)

( * ) Notice: Subject to any disclaimer, the term of this patent is extended or adjusted under 35 U.S.C. 154(b) by 0 days.

(21) Appl. No.: 13/185,497

(22) Filed: Jul. 18, 2011

(65) Prior Publication Data

US 2012/0040740 A1 Feb. 16, 2012

Related U.S. Application Data

(63) Continuation of application No. 11/399,620, filed on Apr. 7, 2006, now Pat. No. 7,980,933, which is a continuation of application No. PCT/ZA2004/000120, filed on Oct. 6, 2004.

(30) Foreign Application Priority Data

Oct. 7, 2003 (ZA) .................................. 2003/7812

(51) Int. Cl.

*A63F 1/00* (2006.01)

*A63F 13/00* (2006.01)

(52) U.S. Cl. ................ 463/12; 463/13; 463/20; 463/22; 463/25; 463/26; 463/27; 273/138.2; 273/274; 273/292

(58) Field of Classification Search .................... 463/12, 463/13, 20, 22, 25, 26, 27; 273/138.2, 138.1, 273/292, 274

See application file for complete search history.

(56) References Cited

U.S. PATENT DOCUMENTS

| | | | | |
|---|---|---|---|---|
| D84,429 S * | 6/1931 | Moore | D21/379 |
| 4,760,527 A * | 7/1988 | Sidley | 463/13 |
| 4,948,134 A * | 8/1990 | Suttle et al. | 463/13 |
| 2002/0077167 A1* | 6/2002 | Merari | 463/13 |
| 2008/0108401 A1* | 5/2008 | Baerlocher et al. | 463/12 |
| 2008/0303214 A1* | 12/2008 | O'Halloran | 273/274 |

* cited by examiner

*Primary Examiner* — Benjamin Layno

(74) *Attorney, Agent, or Firm* — William A. Blake

(57) ABSTRACT

An electronic video game apparatus is configured to facilitate simultaneous play of at least first and second independent games of chance that generate independent outcomes. The electronic video game apparatus includes a video display and at least one electronic random number generator that randomly selects values for the independent games of chance and preferably displays the values in a superimposed manner on the video display. For example, the first game can be a card game while the second game is a dice game. Video representations of the card suit and value for each card in the card game are displayed along with dice values shown on the cards. The outcomes of the second game of chance are preferably employed to determine an outcome, such as a payout or award, for example, of the first game of chance.

20 Claims, 18 Drawing Sheets

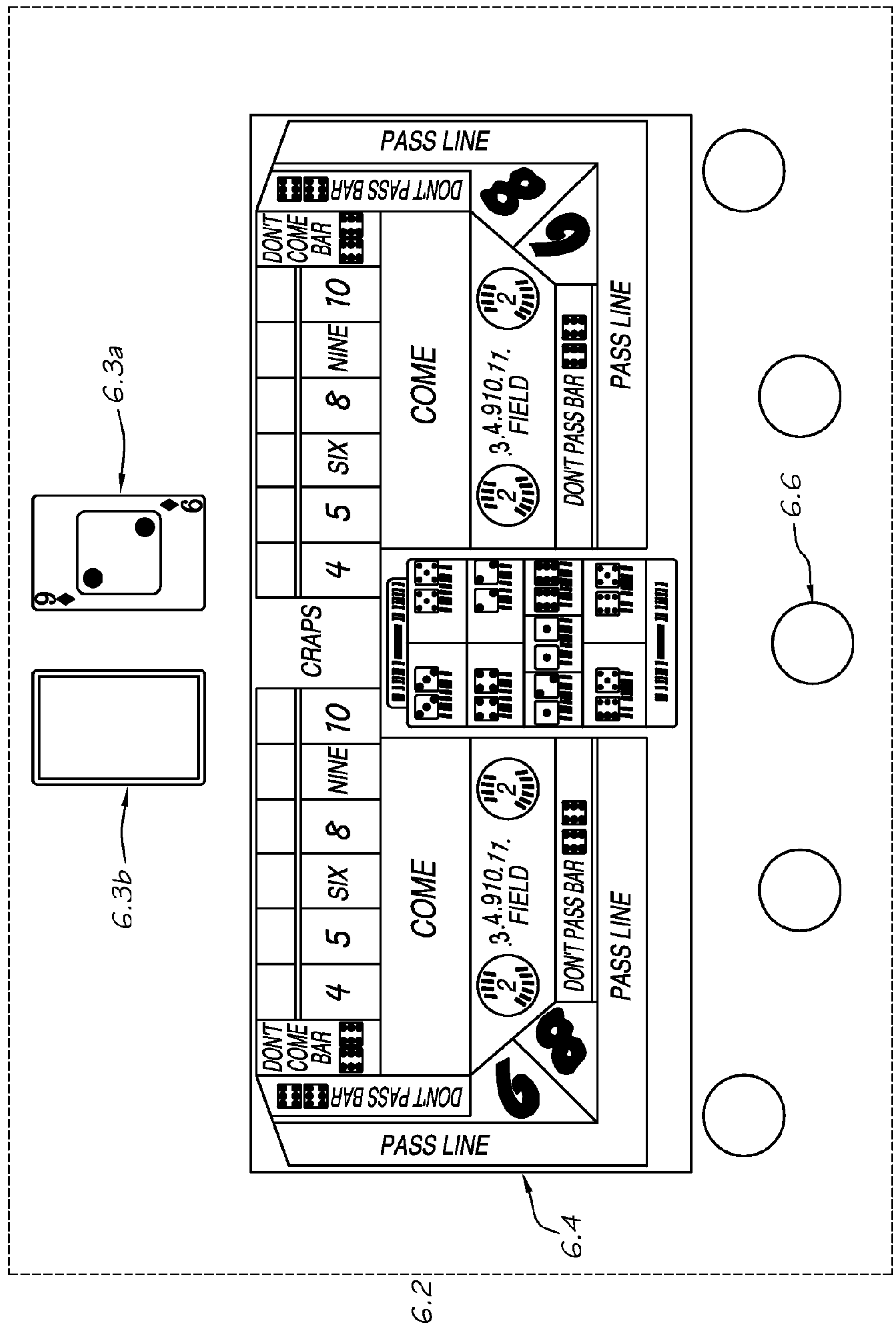
FIG. 6.1

FIG. 6.2
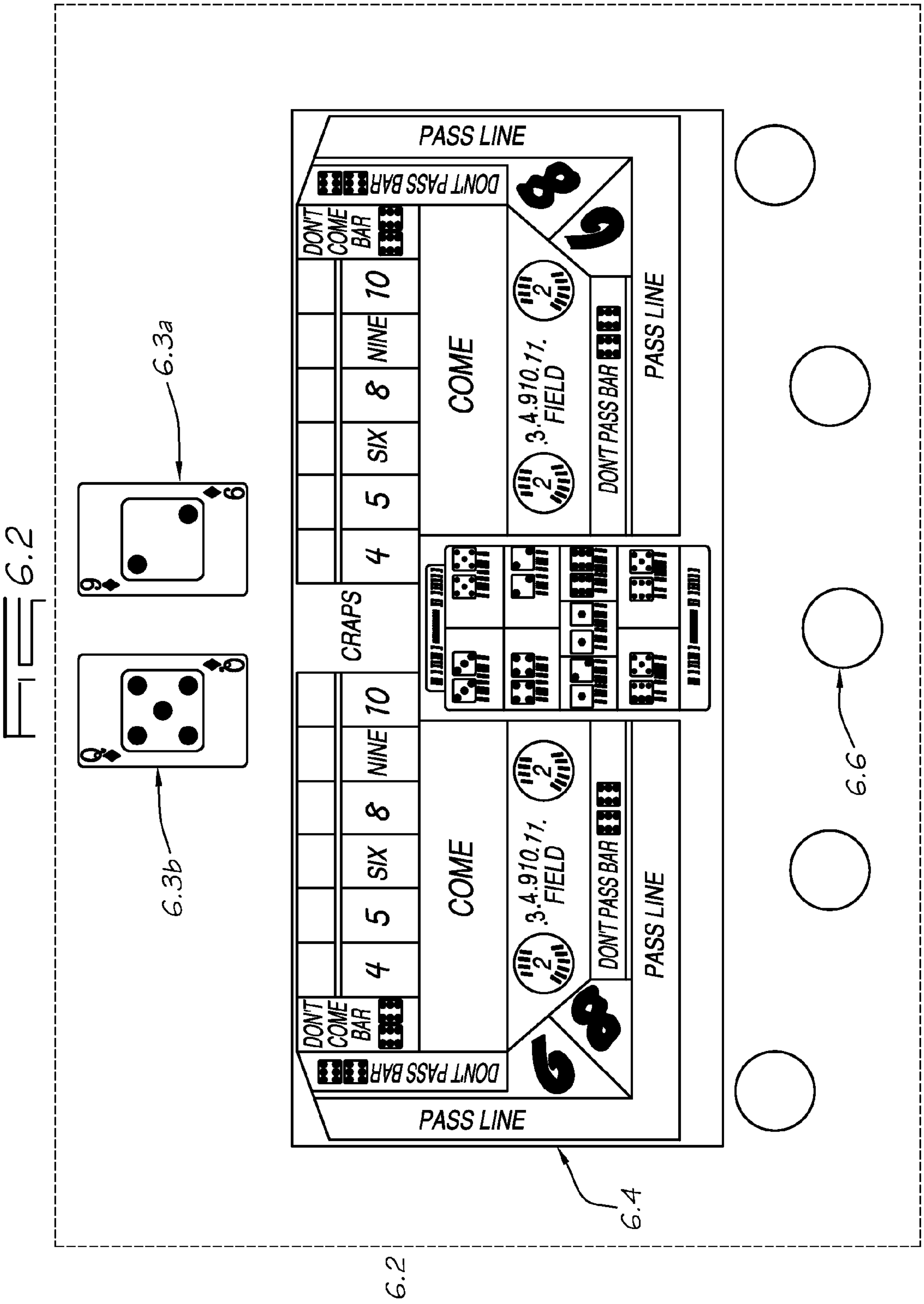

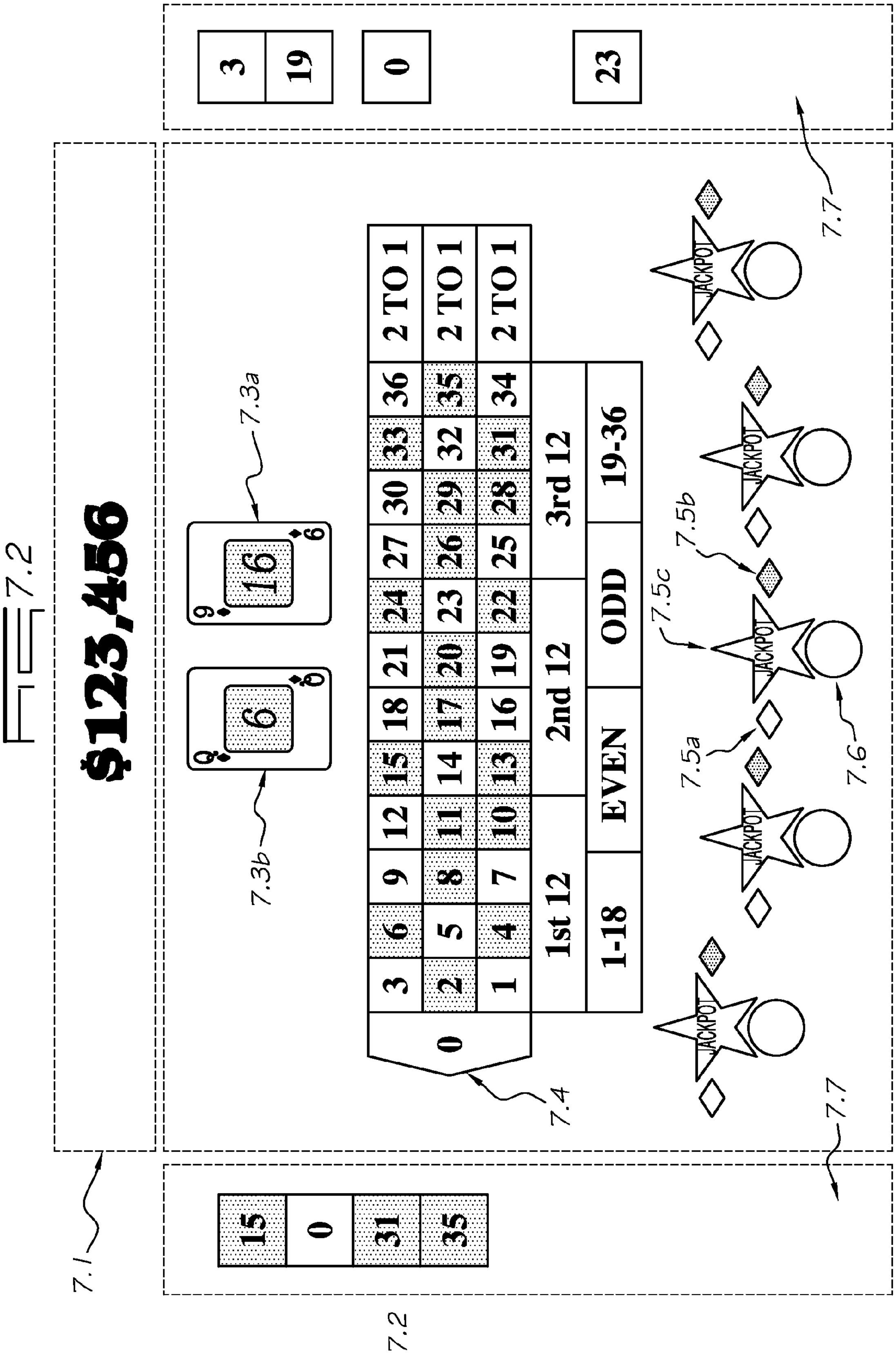
FIG. 7.2

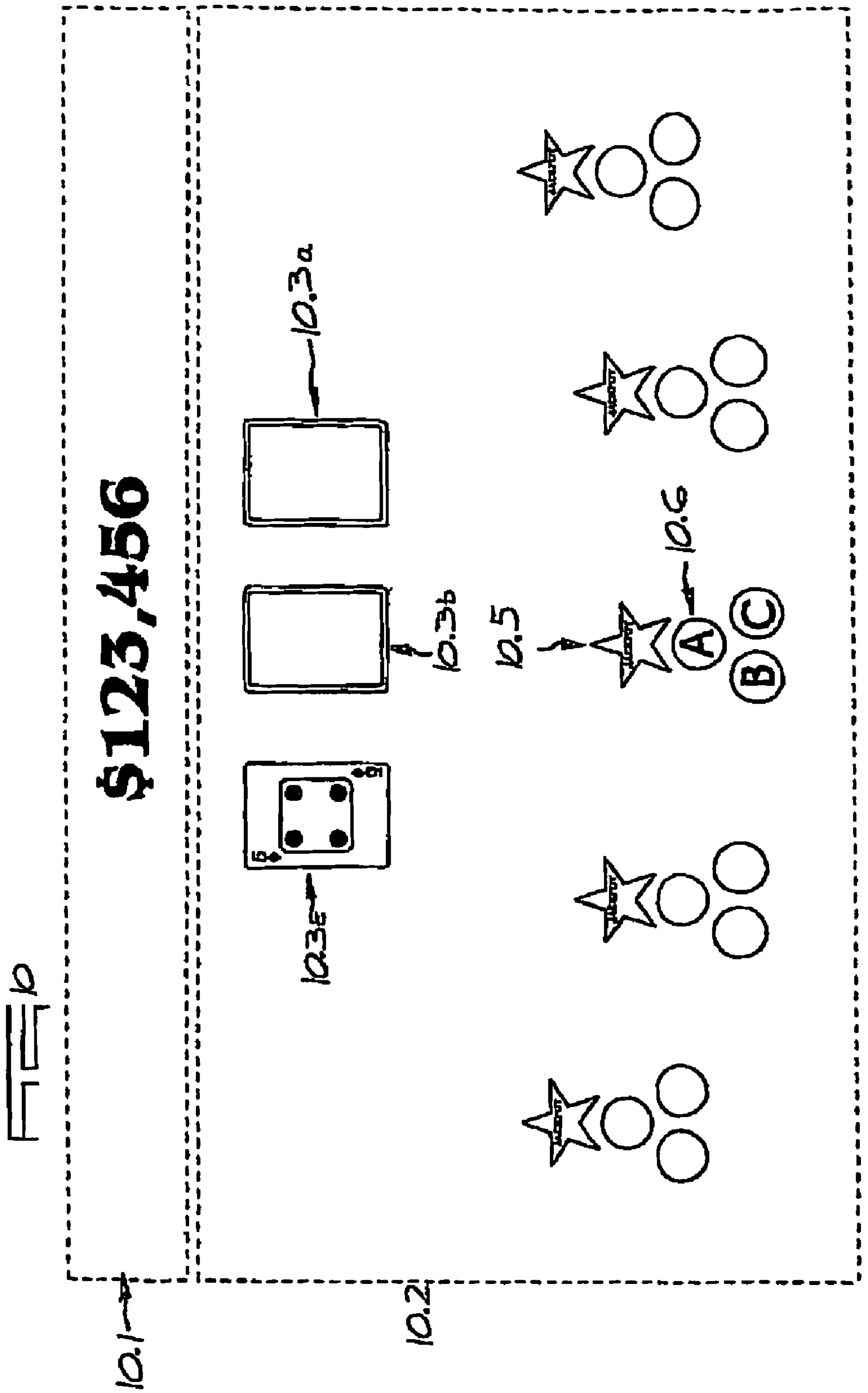
$123,456
10.3a
10.3b
10.3c
10.5
10.6
A
B
C
10.1
10.2

FIG. 12

Yahtzee

NAME

| UPPER SECTION | HOW TO SCORE | GAME #1 | GAME #2 | GAME #3 | GAME #4 | GAME #5 | GAME #6 |
|---|---|---|---|---|---|---|---|
| ACES =1 | COUNT AND ADD ONLY ACES | | | | | | |
| TWOS =2 | COUNT AND ADD ONLY TWOS | | | | | | |
| THREES =3 | COUNT AND ADD ONLY THREES | | | | | | |
| FOURS =4 | COUNT AND ADD ONLY FOURS | | | | | | |
| FIVES =5 | COUNT AND ADD ONLY FIVES | | | | | | |
| SIXES =6 | COUNT AND ADD ONLY SIXES | | | | | | |
| TOTAL SCORE | → | | | | | | |
| BONUS IF TOTAL SCORE IS 63 OR OVER | SCORE 35 | | | | | | |
| TOTAL OF UPPER SECTION | → | | | | | | |
| LOWER SECTION | | | | | | | |
| 3 OF A KIND | ADD TOTAL OF ALL DICE | | | | | | |
| 4 OF A KIND | ADD TOTAL OF ALL DICE | | | | | | |
| FULL HOUSE | SCORE 25 | | | | | | |
| SM, STRAIGHT SEQUENCE OF FOUR | SCORE 30 | | | | | | |
| LG,STRAIGHT SEQUENCE OF FIVE | SCORE 40 | | | | | | |
| YAHTZEE 5 OF A KIND | SCORE 50 | | | | | | |
| CHANCE | SCORE TOTAL OF ALL 5 DICE | | | | | | |
| YAHTZEE BONUS | ✓ FOR EACH BONUS | | | | | | |
| | SCORE 100 PER ✓ | | | | | | |
| TOTAL OF LOWER SECTION | → | | | | | | |
| TOTAL OF UPPER SECTION | → | | | | | | |
| GRAND TOTAL | → | | | | | | |

FIG 14.1
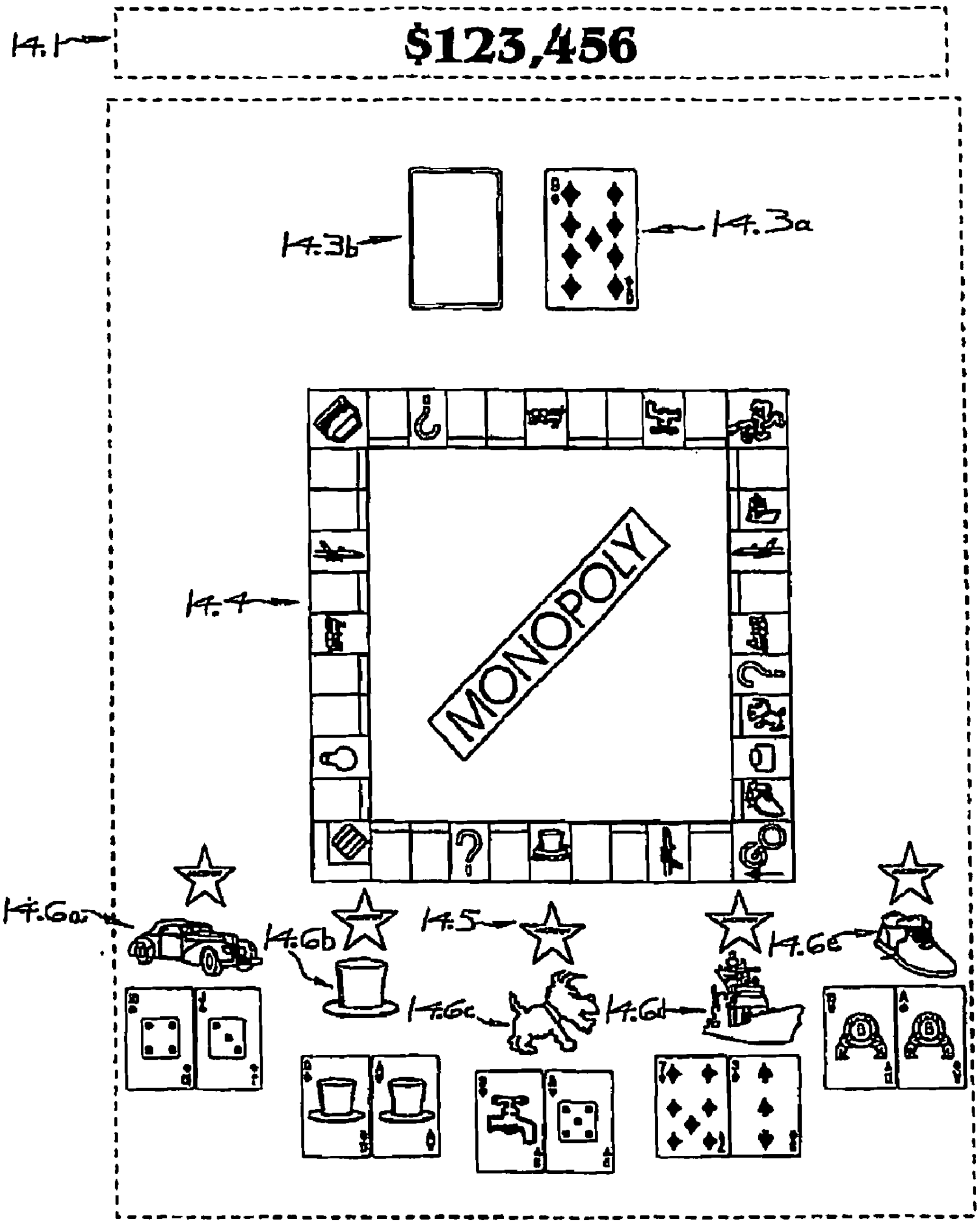

FIG. 14.2
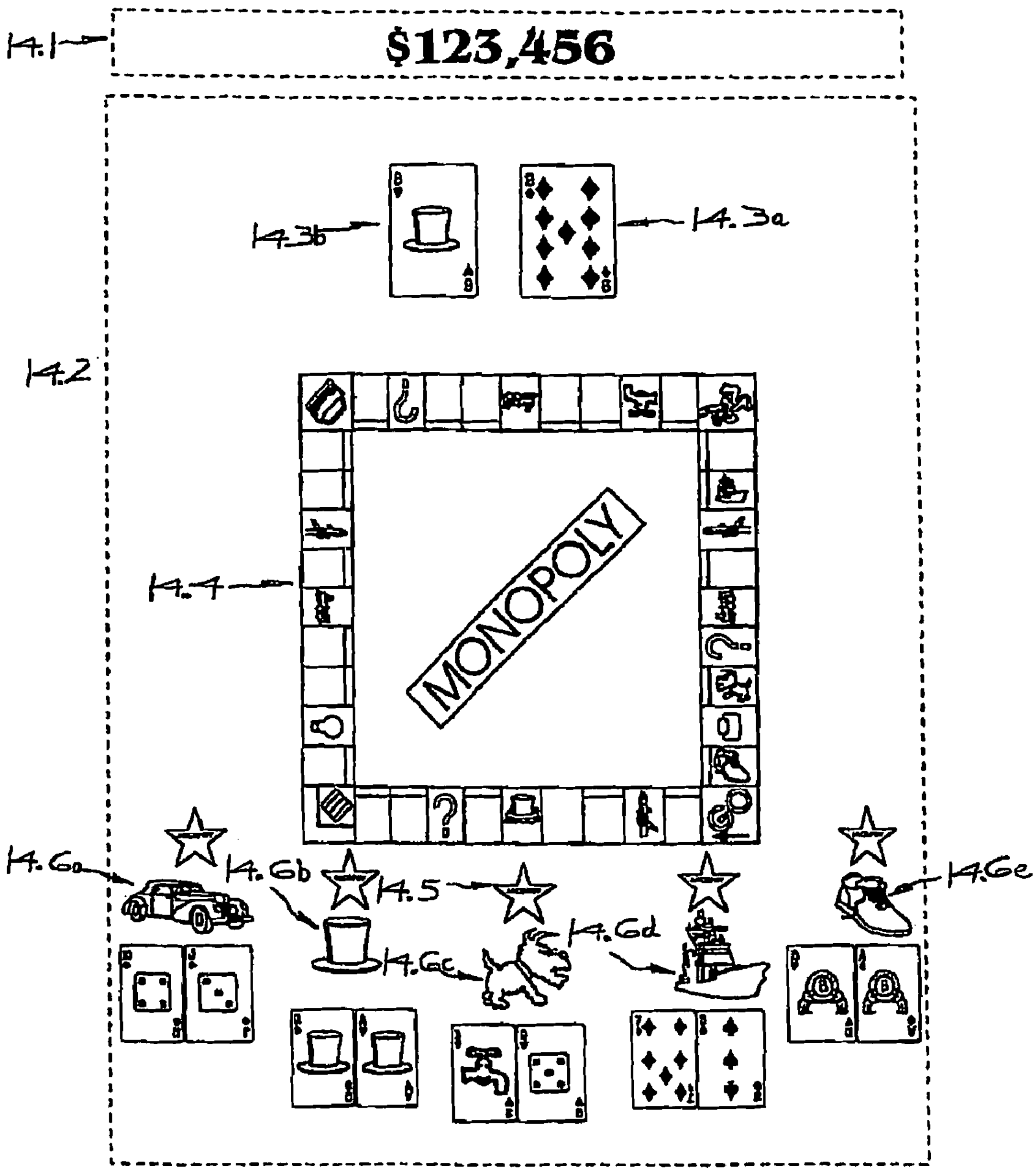

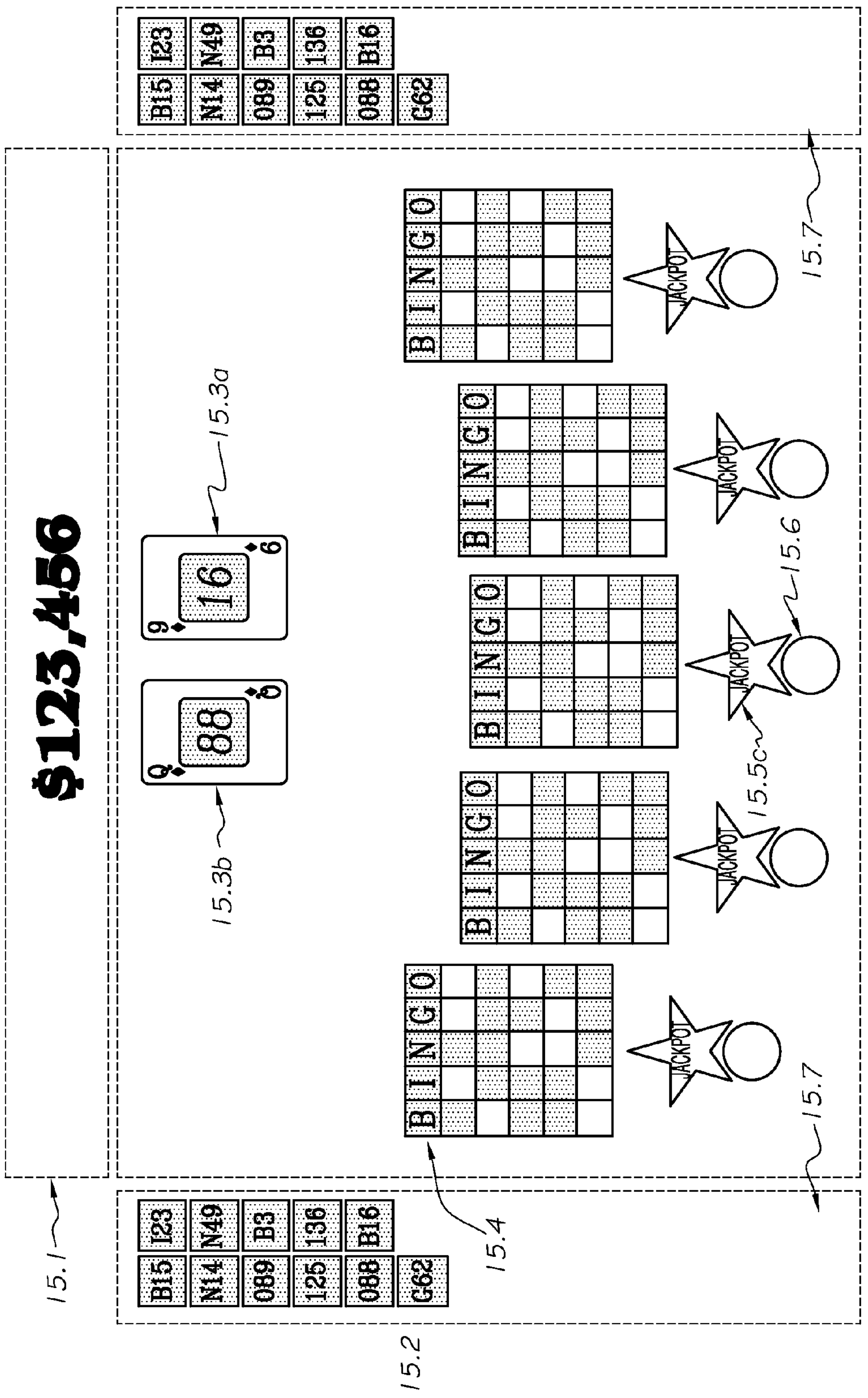
FIG. 15.2

METHOD OF AND APPARATUS FOR PLAYING A CARD GAME

CROSS REFERENCE TO RELATED APPLICATIONS

This application is a Continuation under 35 U.S.C. 120 of U.S. application Ser. No. 11/399,620, filed Apr. 7, 2006, now U.S. Pat. No. 7,980,933, which is a Continuation under 35 U.S.C. 120 and 365(c) of International Application No. PCT/ZA2004/000120, which was filed on Oct. 6, 2004, designates the US and claims priority under 35 U.S.C. 119 and 365(b) on South African Application No. 2003/7812, which was filed on Oct. 7, 2003.

BACKGROUND OF THE INVENTION

The present invention relates to a method of, and apparatus for, playing a card game and, in particular relates to a live casino card game, a video representation of a card game, including internet and video poker versions of a card game, a lottery scratch ticket card game, and any other game apparatus utilizing one or more playing cards in operation of a game.

Due to various factors, such as specific jurisdiction rules and regulations, it is often the case that only certain types of games are allowed in casino operations.

Likewise, economic factors such as the cost overhead to operate a table game can be a determining factor in whether or not a casino will offer a particular game. Roulette, craps, and various card games have differing employee overhead requirements for operation and can have differing revenue performances at different casinos. Often popular casino table games, such as craps, are not offered simply because the employee overhead is too high. For example, three casino employees are typically required to operate a traditional casino craps game.

SUMMARY OF THE INVENTION

The present invention addresses at least some of the foregoing disadvantages by allowing play of a traditional card game without change, while enabling players to participate in an independent game of chance.

An object of the invention is to reduce the operational expenses of certain casino table games.

The invention provides a card game apparatus utilizing one or more traditional playing cards and at least one additional symbol on at least one of the cards related to one or more possible event outcomes of at least one game of chance displayed upon the card or cards.

Some event outcomes are defined as one or more of the possible actions, possibilities, results, or outcomes of an activity in a game.

As an explanatory example, all event outcomes are detailed for a simple game of chance involving one conventional die which is a six-sided object with unique pips, or markings, on its respective sides representing the numbers 1 to 6 uniquely per side of the object.

When a die is rolled and comes to rest a random side is uppermost and the number on that side is displayed (or generated). The possible event outcomes are the pips representing the numbers 1, 2, 3, 4, 5, or 6. More generally when the die is rolled the outcome can be any one of 6 possible event outcomes.

In one embodiment the invention provides a card game apparatus that populates multiple decks of traditional cards with differing symbols of the 6 possible outcomes of the event of a single die being rolled in play.

Preferably each of the 6 possible die outcome symbols are populated and distributed substantially evenly within the total number of cards utilized.

With this embodiment of the invention, a random selection of one playing card from the population of all cards of the apparatus provides a random selection of one outcome event from the possible outcome events, associated with a single die.

The card game apparatus can be utilized with any event outcomes of games of chance.

The event outcomes may include a dice being rolled, a roulette wheel being played, a lottery ball being selected, a Bingo game number being selected, a slot machine being played once, and cards being dealt.

An entire game outcome can serve as an event providing win, loss, or tie criteria to be utilized within the scope of the invention.

Some events can be readily defined as having only a finite number of possible outcomes. These types of events are preferable but are not necessarily required within the scope of the invention.

The principles of the present invention can be utilized with outcome events of any given activity. An activity can be represented by having one or more events associated with the activity represented upon the playing cards, and said one or more represented events affecting the payout, rules, or awards of card game play.

The invention also relates to an improved apparatus and method for playing special symbol card games upon a live casino table, or a video representation of a casino card game.

In one embodiment the invention provides a deck of cards which have conventional markings and wherein at least some of the cards carry symbols associated with events in an independent game of chance.

The deck of cards may vary in number and may include multiple packs of cards. The number of packs may be determined by the nature of a card game which is to be played, using the cards, or by the requirement of distributing symbols on the cards so that the incidence of occurrence of each symbol, as cards are drawn from the deck, complies with known statistical data, or both factors can be taken into account.

The way in which the symbols are associated with events in the game of chance is dependent, at least, on the game of chance. For example a symbol can be associated with the value or colour of a randomly dealt card, with a number generated by the throw of a die or dice, with a final position of a marker over a defined surface, as in the game of roulette, with the occurrence of at least one symbol generated by the play of a slot machine, or the like. The invention is not limited in this respect.

The play of a card game using conventional markings in the cards and the play of the independent game of chance using the symbols thus take place in parallel. Each game can give rise to a prize or award which is independent of the play of the other game. Alternatively the play of one game can determine or influence the payment of an award in the other game, or vice versa.

The cards may be physical conventional cards or the cards may be represented in any appropriate way. For example the cards may be electronic representations displayed on suitable screens or the like.

The invention also provides a method of playing a game of chance wherein one or more events in the game are determined by respective symbols which are additional to conventional symbols on a standard deck of cards.

The independent game of chance may be played simultaneously with a card game wherein events in the card game are determined by conventional symbols on the standard deck of cards.

The independent game of chance can be selected at least from the following: roulette, blackjack, Sic Bo, poker, Yahtzee, Monopoly, bingo, games played with dice or poker dice, the play of a slot machine, the draw of a lottery ticket, or the like.

The invention also provides a card game apparatus including:

at least one deck of traditional playing cards, each card including a value, a card suit, and a card color;

one or more outcome symbols attached to or associated with each playing card, wherein each outcome symbol is associated with an outcome in a set of all possible outcomes in an independent game of chance; and wherein random selection of one playing card from the deck of playing cards also provides a random selection of one outcome symbol of the independent game of chance.

The invention further extends to a card game apparatus including:

a playing surface;

at least one deck of playing cards which can be used for at least a first game of chance, each card including a card value, a card suit, and a card color;

at least one outcome symbol displayed upon each of at least some of the playing cards, wherein each outcome symbol represents one possible outcome in a set of all possible outcomes of an independent game of chance;

a wagering area enabling a player to place a wager on an outcome of a game played with the cards; and wherein an award is paid to a player utilizing a calculation which is dependent upon the independent game of chance outcome symbols displayed upon the cards.

The cards may be traditional (physical) playing cards.

Alternatively the apparatus may include a display and the cards may be video depictions of cards on the display.

The invention also provides a video game apparatus which includes a display for displaying a video depiction of at least one first card game on the display, wherein each card in the first card game has a card suit, a card value and a card color, and wherein at least one of these cards has an additional symbol which depicts at least one outcome of an independent game of chance, and a wagering mechanism enabling a wager to be placed on an outcome which is dependent on at least the additional symbol.

The independent game of chance may be selected at least from the following: roulette; a dice game; a card game.

The symbols may be selected at least from the following: one or more sides of a six-sided die; one or more slots of a roulette wheel; one or more playing cards.

It falls within the scope of the invention to provide a card apparatus including enough playing cards to play at least a first known card game of chance, while populating the cards with symbols of event outcomes of at least one independent game of chance such that random selection of a playing card provides a random selection of the independent game of chance outcomes.

The independent game may have awards that are made independently of any outcome of the first card game. In a preferred embodiment the card values and card suits are not utilized in one or more awards, rules, or operations of the second, independent game which is operated using the event symbols displayed upon the cards.

A preferred embodiment of the invention provides a card deck apparatus capable of playing at least one casino card game while providing a means of random generation of dice outcomes for use in a second independent game of chance.

The apparatus may utilize 6 decks of 52 traditional playing cards. For the purpose of this embodiment, a standard deck of playing cards may be defined as having 52 cards comprised of 4 suits and colors, and 13 cards of each suit. The deck suits include Hearts, Clubs, Diamonds, and Spades. Each suit of cards has 13 cards with the card values of 2, 3, 4, 5, 6, 7, 8, 9, 10, Jack, Queen, King, and Ace. The cards are colored as appropriate.

Any element or attribute of traditional playing cards can be omitted or retained for use in the apparatus of the invention.

In one example of the invention a deck of cards is provided such that the cards have traditional card values and one or more event outcome symbols without the traditional card attribute of card suits.

A deck may be provided which utilizes only traditional card suits and one or more event outcome symbols without the use of traditional card values.

In another variation a deck of playing cards is provided with absolutely nothing on them except that one or more of the cards in the plurality of cards is populated with one or more event outcome symbols.

It falls within the scope of the invention to construct a game such that a continuous automated card shuffler and a card table could be utilized to conduct game play.

Further, traditional decks of cards are known to utilize differing variations in artwork and style. Any of the artwork included in traditional card variations can be used within the scope of this invention.

The use of unique artwork incorporating into the card design the event symbol outcome is intended to fall within the scope of the invention. In a variation of the invention additional non-event symbols such as celebrity likenesses, pictures, or other objects are utilized in combination with the display of an event symbol.

In one example, the aforementioned preferred apparatus, utilized for the play of blackjack could alternatively be used for another card game such as poker with the set of event outcomes differing from the event outcomes of a single die being rolled.

One aspect of the invention relates to the incorporation of independent game event outcomes into the play of traditional card games such that new card games can be created with numerous permutations of game variations and rules of play.

The apparatus may utilize cards with both the card values and the card suits and an additional one or more symbols used as a determinant of outcome for an independent activity e.g. in a calculation of an award.

The apparatus may utilize symbols upon one or more playing cards as a factor of calculation in resolving a wager outcome which is dependent on a predetermined event outcome which does not utilize and which is not based on a card value or on a card suit.

The principles of the present invention can be applied to any card game or representation thereof such as in a video game or on the internet, or on a lottery ticket that uses playing cards or representations thereof during the game play.

Practically any card game including blackjack, baccarat, poker and solitaire utilizing the concept of event outcome symbols upon the playing cards can be played without affecting traditional card game rules and methods of operation.

Special symbols can be placed upon the back side of playing cards.

In this embodiment a first card of a stack of cards will be burnt or discarded, and players can be dealt the cards face down as in the game of Texas Hold'em Poker.

The symbol values revealed upon the backs of the cards can be utilized as a determinant in game play in many different manners.

Cards can also be associated with event outcomes. In this embodiment a plurality of cards would be dealt and a series of event outcomes would be displayed. Some correlation or association of one or more cards with one or more event outcomes can be achieved while enabling play of a card game.

As used herein the term "TableMAX" or "TableMAX video table" refers to a multiplayer video card gaming device, for example of the type described in U.S. Pat. No. 5,688,174.

An illustration of the "TableMAX" device is provided in FIG. 5. This game device includes a multiplayer video card gaming apparatus having more than one player station and a common monitor viewable by each player for the display of the card game play.

Each embodiment of the invention which utilizes a casino card table could employ the "TableMAX" device. Further each embodiment of the invention could be based on video means.

In another variation of the invention, an apparatus according to a first embodiment is utilized in an apparatus according to a second variation to enable the play of a card game.

The card game blackjack, also known as 21, is a popular card game played in casinos around the world. In blackjack one or more players play their respective hands against a common dealer or house card hand. The objective is to obtain a higher score than the dealer without exceeding the count of 21.

In a simple overview of the game craps, one or more players place wagers on a craps table based upon the possible outcomes of 2 dice that are rolled by a player. One or more wagers are paid in accordance with a set of rules and pay values based upon the outcome(s) of the 2 dice that were rolled by the player. Further aspects of the play of craps are not included herein and a basic understanding of both blackjack and the dice game of craps is assumed. Numerous publications detail rules and strategy for both of these traditional casino games and where appropriate reference should be made to these publications.

In one embodiment the invention enable plays of a card game and a traditional craps game.

This preferred embodiment of the present invention enables a blackjack game to be played while allowing players to play a craps game upon the same apparatus without affecting the blackjack game rules and play.

The invention can be configured to allow players to play independently the craps game or the blackjack game, or either game can be played conditionally based upon a wager being placed upon the other game. The last mentioned configuration enables a casino to operate in a manner that reduces operating overhead and improves wagers per player station.

A wager area upon a play table may be introduced that enables a player to place a wager and pays an award based at least in part upon an event outcome symbol displayed upon one or more of the cards being utilized during card game play.

The symbols upon the cards may have numerical values.

An award can be paid based upon the sum value of one or more event symbols displayed upon cards used in the play of a traditional card game without affecting the rules of the traditional card game.

Symbols are used to resolve wagers in an independent game whereby neither the card value nor card suit of the playing card is utilized in the award of a craps payout. Similarly all existing and traditional craps game rules and wagers may be utilized in a preferred embodiment of the invention without affecting blackjack game play.

Therefore both games can be played without affecting the rules of either game, but upon the common surface of one table apparatus utilizing one apparatus for the generation of event outcomes for said respective games of chance.

It is noted that the consolidation of employees and required table equipment used to operate the two games blackjack and craps within the scope of this invention is economically advantageous.

Play of this embodiment of the invention may take place upon a TableMAX video table (see FIG. 5) and this comprises a preferred implementation of this embodiment of the invention.

A player can either play the blackjack game, craps game, or both games, utilizing the apparatus of the invention during each blackjack round played upon the apparatus.

In an embodiment relating to the play of blackjack and roulette separate wager areas upon the table apparatus can be introduced that pay an award wherein the colors RED, BLACK, and GREEN are utilized as criteria in the calculation of said award.

A wager area upon the table may be introduced that pays an award based on an event outcome of one specific symbol or on a range of event symbols or on an outcome which utilizes a combination of card values and/or suit from a first winning card game hand and whereby a card event outcome symbol is used in conjunction with a winning card hand calculation upon one or more cards being displayed during card game play.

An award can be paid for a jackpot based upon a predetermined hand wherein the color of one or more special symbols is used as a criterion for a progressive award.

BRIEF DESCRIPTION OF THE DRAWINGS

The accompanying drawings relate to a plurality of embodiments of the invention and together with the descriptions contained herein serve to explain the principles of the invention. In the drawings:

FIGS. 6.1 and 6.2 illustrate a table used to play craps and blackjack using the principles of the invention;

FIG. 9 illustrates apparatus according to the invention constructed to play 1 deck poker games;

FIG. 12 is a copy of a dice game score sheet used in the game Yahtzee;

FIGS. 14.1 and 14.2 illustrate a table used to play a game called Monopoly Blackjack according to the invention.

("Monopoly" is a registered trade mark which belongs to a third party. This trade mark is used herein merely to illustrate a possible particular application of the present invention.)

Appended hereto are various tables wherein:

Table 1 shows card event symbol distributions used in craps blackjack;

Tables 2 and 2.1 show card event symbol distributions used in roulette 21;

Table 3 shows a roulette 21 odds & pay table;

Table 4 shows card event symbol distributions used in dice poker;

Table 5 shows a dice poker pay table;

Table 6 shows card event symbol distributions in slot cards video poker;

Table 7 shows card event symbol distributions in Yahtzee video poker; and

Table 8 shows card event symbol distributions and a pay table for Monopoly Blackjack.

DETAILED DESCRIPTION OF THE PREFERRED EMBODIMENTS

Each example of the invention is provided by way of explanation, and not limitation, of the invention.

Features illustrated or described as part of one embodiment may be used in another embodiment to yield still further embodiments. Thus, it is intended that the present invention covers all such modifications, variations and combinations or their equivalents.

Figure 1:
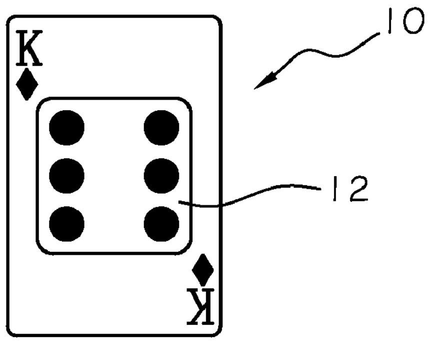
FIG. 1 is an illustration of one embodiment of the invention utilizing symbols of dice event outcomes upon a single playing card.

FIG. 1 is an illustration of a playing card 10 with a symbol 12 depicting one of the 6 possible event outcomes of rolling a single die.

A plurality of playing cards are created such that each card is populated with one of the set of all possible outcomes of a simple game of chance based on the roll of a single die.

Figure 2:
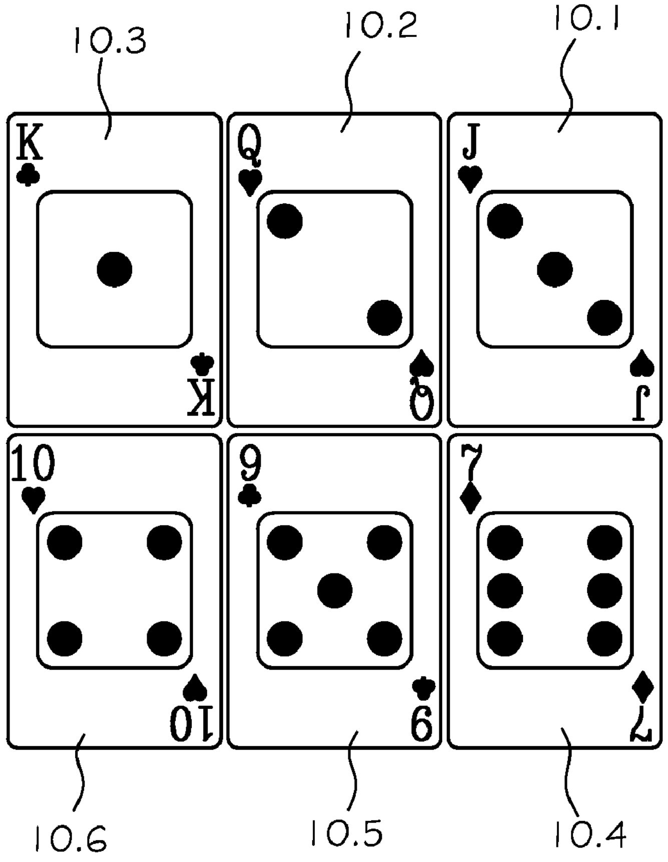
FIG. 2 is an illustration of six cards wherein all 6 possible outcome events of a single die are represented upon the cards.

FIG. 2 is an illustration of 6 such playing cards 10.1 to 10.6 each with a unique symbol depicting one of the 6 possible event outcomes of rolling a single die.

After randomizing a plurality of cards similar to those depicted in FIG. 2 and constituting a complete deck or pack, a selection of a single card from the plurality will provide a random selection of one event outcome of the possible 6 event outcomes of the simple game of chance of rolling the single die.

Figure 3:
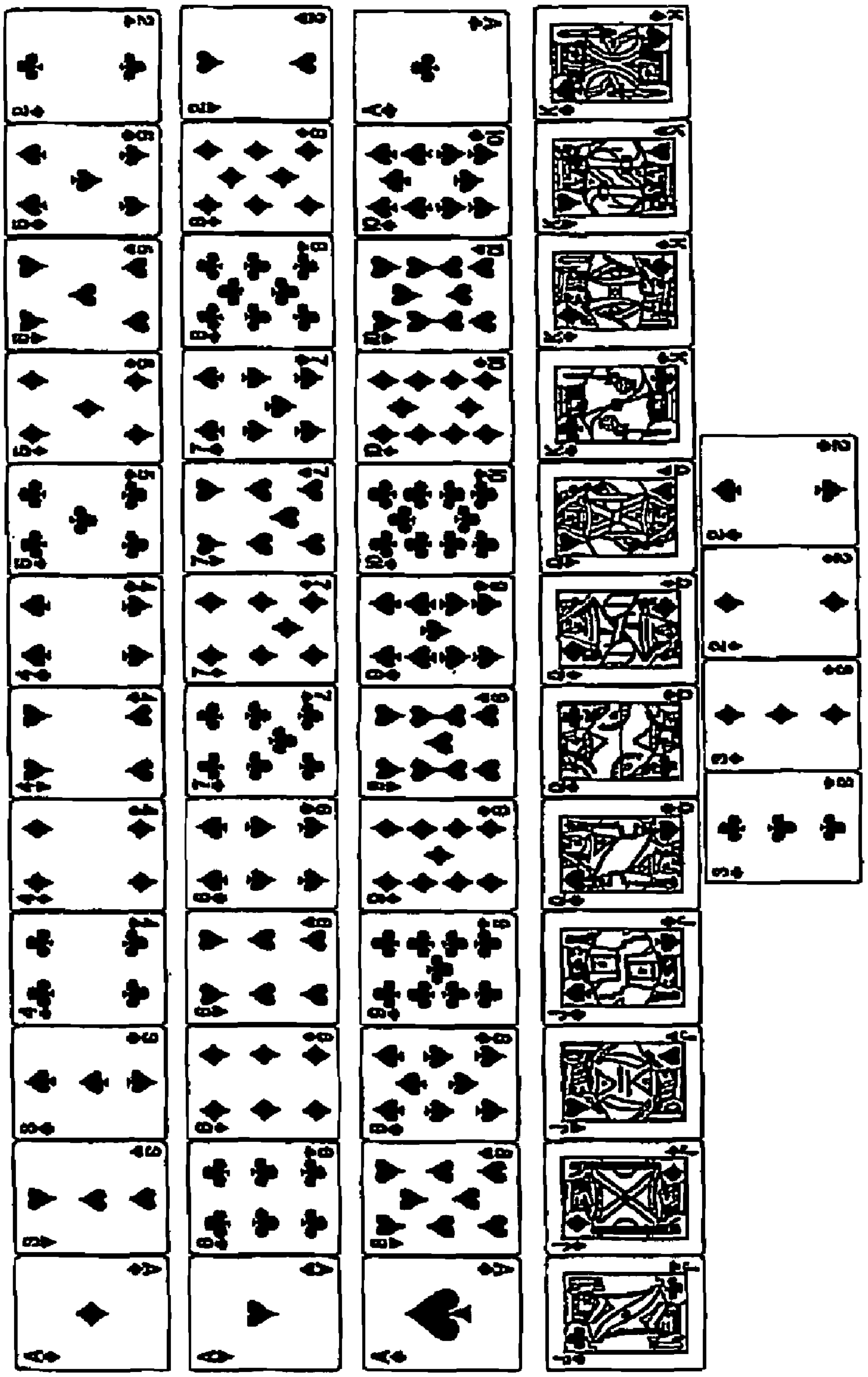
FIG. 3 shows cards of a traditional card deck.

FIG. 3 is an illustration of a complete deck of standard cards.

In one embodiment of the invention use is made of 6 complete traditional decks of 52 traditional cards each with each card labeled with a dice outcome symbol representing the possible outcome of the standard dice as disclosed. However the artwork, typically depicting the card value and card suit, upon the standard cards is removed. Thus each card displays card value and card suit only.

Each card in each of the 6 decks of 52 playing cards has applied to it a single symbol of one event outcome of a single 6 sided die being rolled.

The event outcome symbols of a die roll are allocated to the 6 decks of cards as detailed in Table 1. This form of allocation is such that the random draw of a card is equivalent to the random roll of a die in that there is a 1 in 6 chance of a die value (an event outcome symbol) occurring.

The 6 decks of cards are combined and shuffled. The shuffled cards are placed in a single card shoe and are ready to be dealt for play of the card game blackjack. As known in the art it is common to play blackjack with multiple decks of cards.

When a single playing card is removed from the card shoe it provides a random selection of a card value symbol upon the card, a suit symbol upon the card, as well as an event outcome of one die symbol upon the card.

The random event outcome of rolling one die symbol can be utilized to conduct a random dice game in the same manner as if an actual die were rolled for, as stated, the draw of a card is statistically the same as the roll of a die, in respect of the generation of a die symbol.

Although this preferred embodiment utilizes the disclosed number of decks of cards, numbers, colors, and symbol allocations it is contemplated that differing numbers of decks, dice values, suit colors, dice colors, dice symbols, or dice allocations can be used to enable the play of the game in variations of the invention.

An automated mechanical shuffler can be used to shuffle the cards used in game operation, continuously. Such automated shufflers are known within the art to exist on blackjack game tables. The advantage of a continuous shuffler is that the apparatus is kept in a random state with minimal down time between event possibilities.

FIG. 3 shows the use of a standard deck of cards. However any deck of cards which carry event outcomes displayed upon the cards can be used to enable the utilization or selection of one or more events associated with the symbol display.

Figure 4:
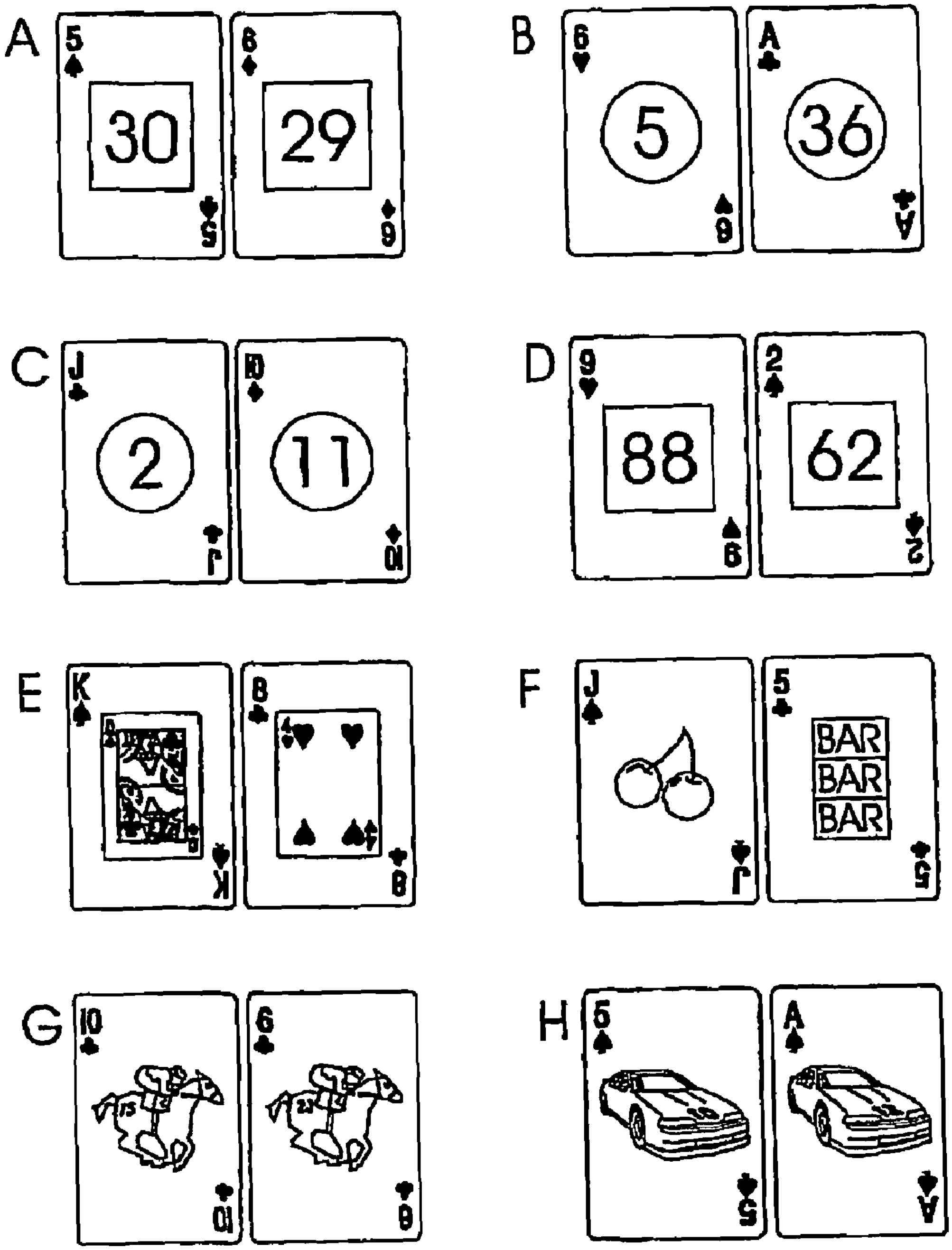
FIG. 4 is an illustration of several different event outcomes that can be used to create independent games of chance.
Figure 5:
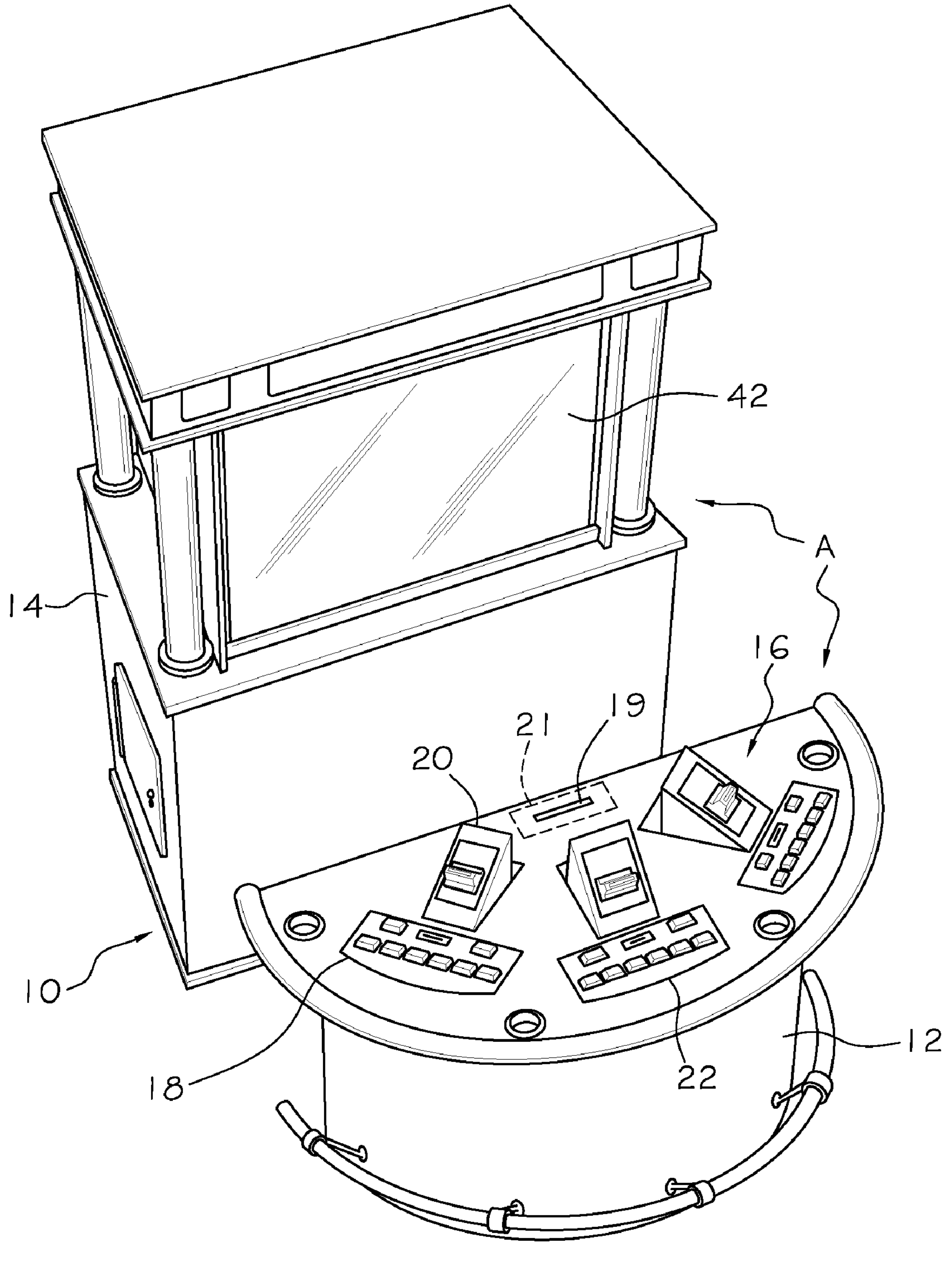
FIG. 5 is an illustration of a patented multiplayer card gaming device sold under the name TableMAX®.

Within the same category of event outcomes of games of chance, the apparatus of the invention could utilize a wide array of games of chance activities with associated event outcomes such as:

| | |
|---|---|
| Roulette | where the event outcomes are possible winning numbers on a roulette wheel, as illustrated in FIG. 4a; |
| Lottery Draw | where the event outcomes are the drawing of one or more numbers from several numbers, as illustrated in FIG. 4b; |
| Keno | where the event outcomes are the drawing of one or more numbers from several numbers possible, as illustrated in FIG. 4c; |
| Card Games | where the event outcomes are being dealt one or more cards from a plurality of cards, as illustrated in FIG. 4d; |
| Bingo | where the event outcomes are one or more numbers being called from all available numbers, as illustrated in FIG. 4e; |
| Slot Machines | where the event outcomes are possible stops of one or more reels used in a slot machine game, as illustrated in FIG. 4f; |
| Horse Racing | where the event outcomes are possible horses eligible to win a race as used in sports wagers, as illustrated in FIG. 4g; and |
| Car Racing | where the event outcomes are possible cars or car drivers eligible to win a race, as used in sports betting, as illustrated in FIG. 4h. |

In each of these embodiments, one or more event symbols displayed upon cards can be representative of an occurrence of an event and a game award can be calculated utilizing the event outcome symbols.

A specific example is using the Lottery Draw outcome events upon a plurality of cards to enable both a card game to be played and to enable a player to be eligible for a future lottery draw. This combination can be utilized upon lottery scratch off tickets enabling purchasers to play a first instant game and a second independent game.

An illustration of a preferred table apparatus utilizing the disclosed invention is in FIG. 6. Although the apparatus is a live casino table, video representations thereof can be created for use in video games and on the internet.

The table in FIG. 6.1 includes a playing surface 6.2, preferably a live casino table, including card game wagering areas 6.6. Each wager area 6.6 is a standard blackjack game wager area. Players place blackjack wagers here prior to cards being dealt.

The casino table has additional markings and wagering options 6.4 on the table to enable the betting of one or more traditional craps wagers.

The wager area 6.4 also provides several wagering options to wager upon symbol outcomes of dice event outcomes during card game play.

Game play begins on the apparatus with all players placing a blackjack wager in the designated blackjack wager area 6.6. After blackjack wagers are placed, players have the option to place one or more craps wagers upon area 6.4.

After all wagers are placed, the dealer deals 1 card to each player, from the left to right of the dealer with the dealer receiving a card last and dealing the first card face down upon the table at location 6.3*b*.

A second card is then dealt to each player with the dealer receiving a second card. After all players have received two cards, the dealer second card is dealt face up at location 6.3*a*.

At this point all players know a half of the dice value outcomes utilized in the craps game play.

Play of the blackjack game commences with normal blackjack game rules. Each player plays his respective hand strategy receiving additional cards as desired from the dealer.

At the end of play of all player hands in the game, the dealer reveals the face down card at location 6.3*b*, referred to herein as the hole card, to all players in the game. This is displayed in FIG. 6.2.

At this point all players know the total outcome of the two dice value outcome symbols utilized in the craps game play.

In this example the symbol values of the hole card and the dealer's first card dealt are utilized for the purpose of providing the random event outcomes of 2 dice being rolled in the play of a craps game.

The dealer's 2 cards have symbol values that contain a die outcome event used to resolve some of the wagers made on the disclosed game table. The dealer's blackjack hand play continues with the dealer playing his hand per standard rules and procedures. Upon completion of the dealer hand, the dealer preferably settles craps wagers per craps rules first and thereafter blackjack hand wagers are resolved. All cards are returned to the automated shuffling device and a new round of play begins.

It is noted that traditional craps rules might warrant one or more of the craps wagers to reside upon respective wager areas. Craps is often referred to as a game of rounds of dice being thrown.

In this case the wagers simply stay upon the wager areas and craps is played exactly as per on a specialty craps table. The next round is conducted by repeating the steps as disclosed herein for game operation.

Blackjack, also known as 21, is a popular card game played in numerous casinos around the world. In blackjack, one or more players play their respective hands against a common dealer or house card hand. The objective is to obtain a higher score than the dealer without exceeding the count of 21.

Roulette is a game played upon a specialty table equipped with a wheel featuring segments with distinct numbers, a ball, and table wagering areas related to the wheel numbers.

In a simple overview, one or more players place wagers on table areas enabling wagers upon related outcomes of the possible wheel spin activity.

The ball and wheel are spun into play and wagers are paid in accordance with a set of rules and pay values based upon the outcome of the ball resting upon a unique number within the roulette wheel.

One embodiment of the invention enables a blackjack game to be played while allowing players to play a roulette game upon the same apparatus without affecting the blackjack game rules and play.

The players may independently play either the blackjack game or the roulette game, or either game can be played conditionally based upon a wager being placed upon the other game.

A preferred embodiment of the invention is a card game apparatus created utilizing 7 traditional decks of 52 cards. Each deck retains the traditional card values and suit symbols.

Additionally, the cards are populated with event symbols containing the numbers 0 to 36. The symbol 0 is displayed with a dominant color of GREEN, 18 numerical event outcome symbols are displayed with a dominant color of RED, and 18 numerical event outcome symbols are displayed with a dominant color of BLACK.

An illustration of a sample of the preferred cards utilized within the 7 decks as constructed within the scope of this invention is disclosed in FIG. 4*a*.

The complete allocation of symbols upon the 7 decks of cards used in this embodiment is detailed in Table 2.

Although this preferred embodiment utilizes these numbers, colors and symbol allocations, it is envisaged that differing numbers, colors, symbols or card event symbol allocations can be used to enable the play of the game in variations of the invention.

Figure 7:
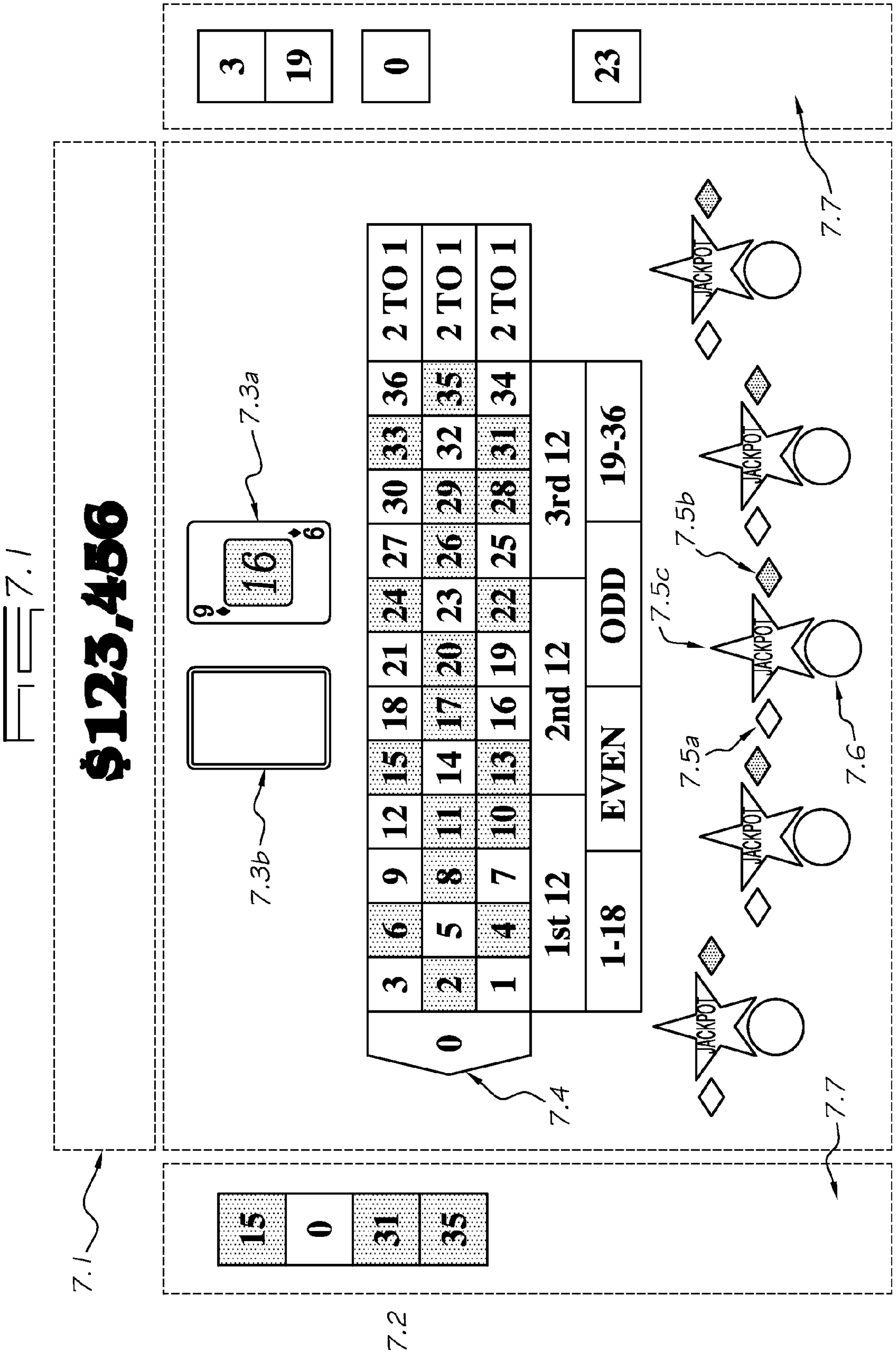
FIGS. 7.1 and 7.2 illustrate a table used to play roulette and blackjack in accordance with the invention.

An illustration of a preferred table apparatus to implement this embodiment of the invention is in FIG. 7.1.

Item 7.1 is a progressive display means. Item 7.2 is a game play surface as encountered on a casino card table, TableMAX, or other video game representation. Items 7.3*a* and 7.3*b* are dealer card position areas where cards are dealt in the game. Item 7.4 is a roulette wagering area for the game of roulette. Items 7.5*a*, 7.5*b*, 7.5*c* are symbol outcome related wagers including a progressive bet. Item 7.6 shows game wagering areas for the game of blackjack.

The game utilizes an automated mechanical shuffler to shuffle the cards used in the game continuously.

Additional wager areas are made available upon the table and located within close proximity to the blackjack wager areas 7.6. These additional side bet wagers are detailed as 7.5*a*, 7.5*b*, and 7.5*c* and are wager areas that enable game players to place specific wagers upon the outcome color of the symbol displayed upon the cards as detailed herein.

Wager area 7.5*a* is a wager area that the dealer's hole card will have a symbol with a first color, preferably the color of RED. Wager area 7.5*b* is a wager area that the dealer's hole card will have a symbol with a second color, preferably the color of BLACK. The wager areas 7.5*a* and 7.5*b* are utilized to wager on the traditional card suits which use the colors of RED or BLACK.

Wager area 7.5*c* is a wager area enabling a player to bet upon obtaining a blackjack.

This example enables a player to participate in a separate side bet upon the area 7.5*c* that the player's hand will contain differing arrangements of a blackjack hand.

If a player places a wager upon this area and is dealt a blackjack hand comprised of cards with a GREEN colored symbol then the player wins a progressive jackpot award.

U.S. Pat. No. 4,861,041 issued to Jones discloses a progressive side bet system that can be utilized in this embodiment of the invention. However, other jackpot configurations and methods such as a fixed side bet wager are possible.

The area 7.1 represents a separate Progressive Win meter and, in a video application, a progressive meter could be displayed upon the video screen.

The wager area 7.4 provides several wagering options to wager upon the specific symbol event outcomes in game play. Included within the wagering options are specific symbol outcome wagers whereby a player wagers upon a specific number displayed upon a symbol which is included upon each playing card. For example a player can wager upon the wager area 7.4 that includes the number 11. If the dealer's hole card reveals a symbol that contains the number 11 the player wins an award.

Players can place wagers upon specific groups of symbol outcomes. The area 7.4 enables a player to wager that ranges of symbol outcomes will be displayed in blackjack game play. For example, a player can wager an amount in the area 7.4*a* related to the outcome of the number 3. If the symbol displaying the number 3 is revealed in game play the player wins an award.

The betting regions in the area 7.4 are standard American roulette wager regions which are familiar to those skilled in the art.

In areas identified as 7.7 an historical event meter can be utilized. This meter assembly can be detached from the game in operative communication or can be displayed in a video version of this game preferably on the left and right sides of a video screen. The historical event meter provides a historical list of one or more events within the card game and in this embodiment displays a list of the most recent outcomes of the dealer's hole card value symbol.

The possible outcomes displayed are the color and the number represented upon the symbols displayed on the cards.

The meter when utilized in an onscreen mode within a video version of this embodiment can display all historical events related to the definable criteria and color that represents the color of the wager area 7.5*a* on the left side of the monitor.

Additionally, the historical event meter can display upon the right side of the video monitor the historical events related to the color of wager as used in the wager area 7.5*b*.

When an historical event is displayed that utilizes the color of the wager area 7.5*c*, these event displays are displayed on the left and right sides of the monitor. This is illustrated in FIG. 7.2 in that the zero occurrences are logged in both columns.

Game play begins on the apparatus with all players placing blackjack wagers in the designated blackjack wager area 7.6. After blackjack wagers are placed, players have the option to place one or more roulette game wagers upon areas 7.4, 7.5*a*, 7.5*b*, or 7.5*c*.

The use of the wager area 7.4 is optional. A version of the game can use these wagering areas or simply utilizes the wager areas of 7.5*a*, 7.5*b*, and 7.5*c* for roulette wagers in conjunction with the wager area 7.6 for the respective blackjack wagers.

After all wagers are placed, the dealer deals one card to each player, from the left to right of the dealer, with the dealer receiving a card last and dealing the first card face down upon the table at 7.3*b*.

A second card is then dealt to each player with the dealer receiving a second card. After all players have received two cards, the dealer's second card is dealt face up at the location 7.3*a*.

Play of the blackjack game commences with normal blackjack game rules. Each player plays his respective hand strategy receiving additional cards as desired from the dealer. At the end of play of all player hands in the game, the dealer reveals the face down card, referred to herein as the hole card, to all players in the game. In this example the hole card symbol value is utilized for the purpose of providing the random event symbol outcome of a roulette game event occurrence. Thus, the dealer's hole card has a symbol value that contains a number and color used to resolve one or more of the wagers made upon the game table apparatus.

Additionally an event symbol upon the dealer's hole card displayed at the location 7.3*b* is used for the purpose of resolving wagers at the locations 7.4, 7.5*a*, and 7.5*b* without use of the card value or card suit upon the card displayed at the location 7.3*b*.

Dealer blackjack hand play continues with the dealer playing his hand per standard rules and procedures. Upon completion of the dealer hand, the dealer marks the corresponding number and color upon the wager area 7.4. Preferably the roulette wagers are resolved first, and thereafter blackjack hand wagers are resolved.

Within the scope of the roulette wagers, a side bet at the location 7.5*c* is resolved if the player has made the wager and obtains one of the winning combinations posted.

A wager area upon the table apparatus may be introduced that pays an award based on the color of one or more symbols upon one or more cards.

Table 3 provides odds upon the disclosed game and a pay table of the preferred payout structure of the progressive wager option 7.5*c* and of the statistics of a preferred embodiment of the invention in comparison to a traditional American roulette table game.

American roulette is utilized as it has a single zero and typically the best odds of various versions of roulette that exist, although other versions of roulette could be simulated upon the apparatus if desired.

It can be seen from Table 3 that the odds upon the roulette blackjack game disclosed herein are more favorable than a wager upon a traditional American roulette table. This was done intentionally, by omitting several of the possible GREEN outcomes from the distribution applied to the cards in this embodiment of the invention. The invention enables this type of alteration in the disclosed methodology of applying event symbols to playing cards.

The odds of roulette wagers can be improved for the players without any effect on the game payouts or operation of the roulette game operation.

The game is operated in the preferred manner of players being required to place a first blackjack wager, and then being eligible to place the enhanced roulette wagers as detailed. This preferred method of operation enables each position at the table apparatus to be utilized in a more profitable manner enabling the return on the apparatus to be increased. This is accomplished by the slightly lower hold upon the roulette wagers being in addition to, and only paid in conjunction with, an underlying required normal blackjack wager.

Play of this embodiment of the invention upon a live table, TableMAX, or on the internet is contemplated.

In another embodiment play is implemented upon a card game of poker. This can be applied to literally any existing version of a poker game.

Figure 8:
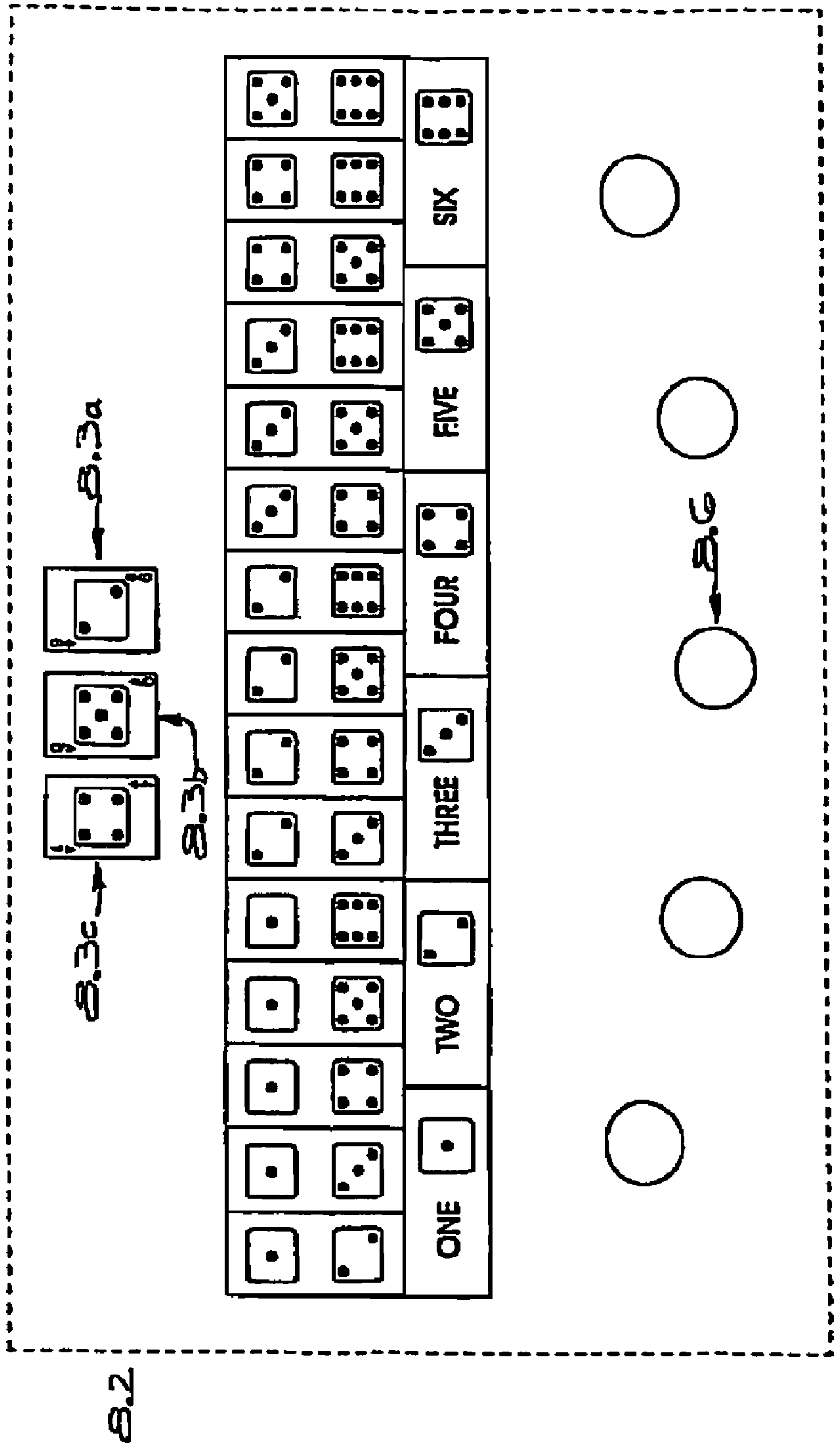
FIG. 8 illustrates a table used to play Sic Bo and blackjack using the principles of the invention.

An illustration of this embodiment of a preferred table apparatus utilizing the disclosed invention is in FIG. 8 which shows a live casino table. Video representations thereof can however be created utilizing the apparatus and features thereof disclosed herein.

The preferred table in FIG. 8 includes a playing surface 8.2 which includes game wagering areas 8.4 & 8.6. The wager area 8.6 is a card game wager area and the area 8.4 is a collection of wagering areas dedicated to the outcomes of dice rolled events as represented by symbols applied to cards, as disclosed herein.

This embodiment utilizes a continuous card shuffling device to keep all unused cards shuffling at all times.

In this embodiment the table utilizes 3 cards in the calculation of dice values. These cards are preferably displayed in card areas 8.3*a*, 8.3*b*, and 8.3*c*.

Players are allowed to place wagers upon either a poker game or on a Sic Bo wagering area on the table. Sic Bo is a dice game played for centuries in China. It utilizes 3 dice and players are able to place wagers upon various outcomes of the 3 dice being rolled.

The wagering options 8.3 are from the traditional Chinese dice game of Sic Bo.

A simple poker card game is played with a dealer dealing each player three cards. Additionally, the dealer deals a house or dealer hand with three down cards upon the table at positions 8.3*a*, 8.3*b*, and 8.3*c*.

This embodiment of the invention uses a 6 deck shoe of traditional cards marked with dice symbol outcomes as previously disclosed. Table 1 is the allocation used in this embodiment.

Play begins with players either placing a poker wager, Sic Bo wager(s), or a combination of both. It is not required that players play the poker hand. The game is played with a dealer simply playing the house hand against the players in the game. As the dealer reveals the three cards at positions 8.3*a*, 8.3*b*, and 8.3*c* players are paid on previously placed wagers located upon the various Sic Bo wagering areas located upon the apparatus as detailed at the area 8.4.

The playing surface thus provides a wagering area for the wagering of specific outcomes of one or more symbols displayed upon the playing cards, whereby card suits and values are not utilized. In this embodiment wagers are placed upon the occurrence of multiple cards containing predefined event symbol outcomes upon said cards. It is envisaged that this embodiment of the invention can be implemented upon a TableMAX video table.

Another preferred embodiment of the invention is based on a community card game version of poker.

The card game Let it Ride is a popular game played in many parts of the world. At the center of the game's popularity is the use of community cards. This art is not novel and is known to be a part of the rules of many versions of poker games for decades.

The principles of the invention can be utilized in an apparatus which is used to create a version of a poker game that utilizes both the event outcome symbols and traditional poker outcomes combined to introduce an improved poker game.

The game utilizes one deck of 52 playing cards in which each card is allocated a die symbol as per Table 4. FIG. 9 is an illustration of the complete deck of 52 cards utilized in this embodiment. The disclosed cards once randomly shuffled are ready for use in the game play.

The game play preferably utilizes preferably a card table equipped with a known method and apparatus utilized in the play of progressive card games that provide a side bet wager. U.S. Pat. No. 4,861,041 issued to Jones discloses a progressive side bet system that is utilized in this embodiment of the invention.

Figure 10:
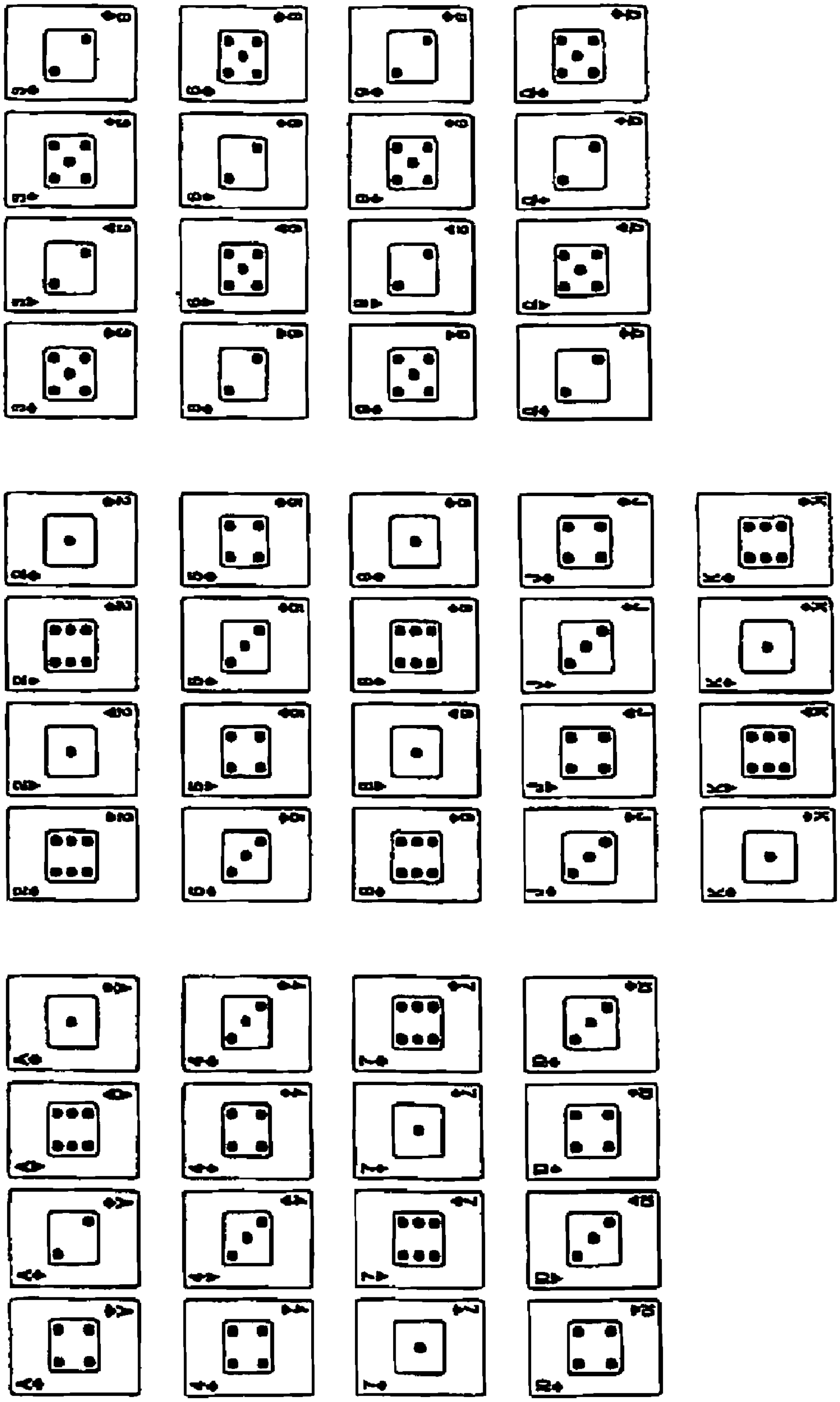
FIG. 10 is an illustration of a table used to play a dice poker game using the principles of the invention.

FIG. 10 is an illustration of the preferred apparatus used in this embodiment. Item 10.1 is a progressive display means. Item 10.2 is a game play surface as used upon a casino card table or TableMAX. Items 10.3*a*, 10.3*b*, and 10.3*c* are community card location areas respectively for three community cards dealt in the game. Item 10.5 is a progressive side bet wager area. Items 10.6*a*, 10.6*b*, and 10.6*c* are game wagering areas. Items 10.7*a* and 10.7*b* are illustrative positions upon which players are dealt cards in game play.

The game begins with each player placing his respective ante wager at a wager position 10.6*a*, 10.6*b* or 10.6*c*. After wagers are placed, the dealer deals one community card on to the table face down at the location 10.3*c*. The dealer then deals each player one card from the dealer's left to right, preferably to a position 10.7*a*.

The dealer deals a second community card face down on to the table at the location 10.3*b* and then deals each player a second card from the dealer's left to right to a position 10.7*b*.

The dealer deals a final community card face down on to the table at the position 10.3*a* and then turns over the first community card dealt to the area marked 10.3*c*.

Each player at this point has two cards in his respective hand and a single common revealed community card, residing at the location 10.3*c*.

The objective of the game is to obtain the best 5 card poker hand possible and achieve a hand ranking that is eligible for a predefined award.

At this point players have an option of increasing their respective wagers by placing a second wager upon the wagering areas 10.6*b*. After the betting interval, the dealer then turns over the second community card dealt to the area marked 10.3*b*. Each player then has 2 cards in his respective hand and 2 common revealed community cards, residing face up at the locations 10.3*c* and 10.3*b*. The players then have an option of increasing their respective wagers by placing a third wager upon the wagering area 10.6*c*.

After the betting interval, the dealer turns over the third and final community card dealt to the area marked 10.3*c*. At this stage the 2 community cards of each player and the value of each 5 card hand, formed by each player's respective 2 cards and the 3 community cards, are known.

The dealer resolves bets based upon the outcome of each player's complete 5 card hand. The wagers are resolved utilizing a predefined award for each of a number of predefined hand rankings. This award allocation is referred to in the art, and hereafter, as a Pay Table.

The aforementioned method of card game play is combined with the dice cards previously described to enable the creation of an improved poker Pay Table utilized in the awarding of pays to players for hands obtained in the game.

The Pay Table used to award pays in the disclosed game is detailed in Table 5.1. The Pay Table incorporates into the award calculations, payouts to players for achieving hands that comprise certain combinations of the disclosed dice values that are resident upon the player's cards in each of the 5 card hands. This method of utilizing the disclosed apparatus enables the players to achieve potential awards based entirely or in part upon the dice values.

One advantage of this method is that it enables a player who typically has a non-winning hand based upon the rankings of traditional card hands to win an award based upon the independent dice symbol outcomes. The disclosed allocation of the dice upon the cards enables additional winning combinations to be awarded to players that would not be typically awarded. This is evident from a comparison of Table 5.1 and Table 5.2.

When comparing the disclosed game with an existing community card game that uses only traditional card rankings, it is clear that by using the same common payout awards that the additional payouts in the disclosed game labelled A and B (Table 5.1) enable the game to be operated allowing both a higher hit ratio and payout percentage for the player.

Any combination of cards and event outcomes can be utilized within the scope of the present invention to create numerous card games rules, variations, and pay tables. For example a card game award can be based upon one or more event symbol occurrences displayed upon the cards used in the card game. Also the use of outcome symbols on cards can be utilized in the awarding of pays within progressive jackpot games.

As stated U.S. Pat. No. 4,861,041 discloses a progressive side bet system that is applicable to many differing card games. The practical implementation of this invention is applicable to this system and any other progressive gaming system that utilizes the disclosed event outcome symbols upon playing cards as a determinant of progressive award criteria or within any operation of such progressive systems.

In another embodiment of the present invention the dice values upon one or more cards can be used as a determinant in game operation.

The example of the improved poker game, illustrated in FIG. 10, can be operated with an additional condition or rule of the game that all awards require that the 3 stated community cards, located at positions 10.3*a*, 10.3*b*, and 10.3*c*, must have a dice total of a certain value before the player receives any award. With this conditional application of the common cards totalling a predefined amount, for example 8 or more on the dice values combined, the pay table on the card game can then be scaled upwards enabling larger wins to be awarded to the players.

Although the hit frequency is decreased by the fact that roughly 16% of the time the players with winning hands will not be paid, the criteria upon which players are paid can be increased to offset this fact. In the game version in Table 5.3 using the disclosed dice value criteria the minimum pay award for the game can be lowered to a pair of 9's or better versus the standard pair of 10's or better Pay Table.

Preferably, the progressive side wager pays as detailed in Table 5.1 are paid independent of the hand qualification criteria. Thus, a progressive wager in this embodiment is paid regardless of the dealer's dice value total.

By utilizing a qualification means upon which a player will not receive an award as disclosed above, the play of the progressive side bet wagers options is substantially increased. This is a result of the fact that the progressive side wagers are then operated with a newly introduced element of insurance value that did not exist before. A player will play the side wager option to "insure" that, upon receiving a rare hand, such as a Royal Flush, a pay will indeed be awarded.

A progressive wager could optionally be paid based upon an event symbol in the cards-based criteria.

The value of the event symbols upon the cards can be used in numerous ways to be a calculation factor upon which the card game operates. In this variation it is taught that a sum calculation of the event symbols on one or more cards can be used as criteria upon which the card game pays an award. Further, the event outcome symbols used in the game can be a determinant of, or calculation factor in, a card game.

The card game and any card value-based calculation can be used as a calculation factor in the rules of the dice game played with dice values placed on playing cards. Numerous independent and dependent rule permutations can be created that utilize the event outcome symbols upon the cards as criteria in the calculation and/or operation of game play.

In any of the embodiments a method of randomized weighted or not weighted symbol allocation could be used for the purpose of allocating event symbols. The method can be used so that the event outcome symbols are rare and appropriate to be utilized in a progressive system.

Play of each of these embodiments of the invention can be implemented upon a TableMAX video table. This constitutes a preferred means of operation of the apparatus.

Additional embodiments of the present invention that utilize the described playing cards include the following:

Roulette selection outcome events (FIG. 4*a*);
Lottery Draw selection outcome events (FIG. 4*b*);
Keno number selection outcome events (FIG. 4*c*);
Bingo number selection outcome event symbols (FIG. 4*d*);
Card selection outcome event symbols (FIG. 4*e*);
Slot machine event symbols (FIG. 4*f*);
Horse race event outcome symbols (FIG. 4*g*); and
Car racing event outcome symbols (FIG. 4*h*).

Slot Machine Symbols Upon Card Games

A basic knowledge of slot machines and multi-line video slots is assumed in the following description. Information thereon is readily available in numerous publications.

One embodiment of the present invention enables the creation and play of a slot machine type independent game while allowing the play of any traditional card game. In this embodiment an apparatus is used to enable slot machine and video game creation that utilizes traditional playing cards within the operation of the card games. To achieve this, a card apparatus is provided wherein outcome event symbols upon each card in the population of all cards represent the possible outcomes of each rotational stop of a single reel used in a typical slot machine. Thus, random selection of one card from the card apparatus enables random selection of one symbol depicting an outcome event of one rotational stop upon a slot machine reel, and operation of one or more of the apparatus decks of cards enables the simulation of one or more reels of slots.

Table 6 is an allocation table of slot outcome event symbols upon a deck of playing cards that provide the same allocation of possible event outcomes as an illustrative slot reel. Table 6A provides an analysis of a slot machine operating with 3 reels. Table 6B provides an analysis of 3 sets of the apparatus each utilizing 52 cards from a standard deck of playing cards. Upon each card in each of the 3 apparatus decks are the same slot machine event outcomes distributed as symbols upon the cards. It is noted that the reel stops have 26 possible positions and the card decks have 52 playing cards.

Each of the possible events of the reel outcome has been represented upon the plurality of cards utilized such that the probability of an event occurring upon any one slot reel is the same as random selection of one card from the apparatus. It can be seen that the probability of conducting a game utilizing the slot event outcome symbols being displayed upon 3 cards mirrors the probability of playing a 3 reel slot machine. This feature of the invention can be utilized to introduce improved versions of video card games.

Figure 11:
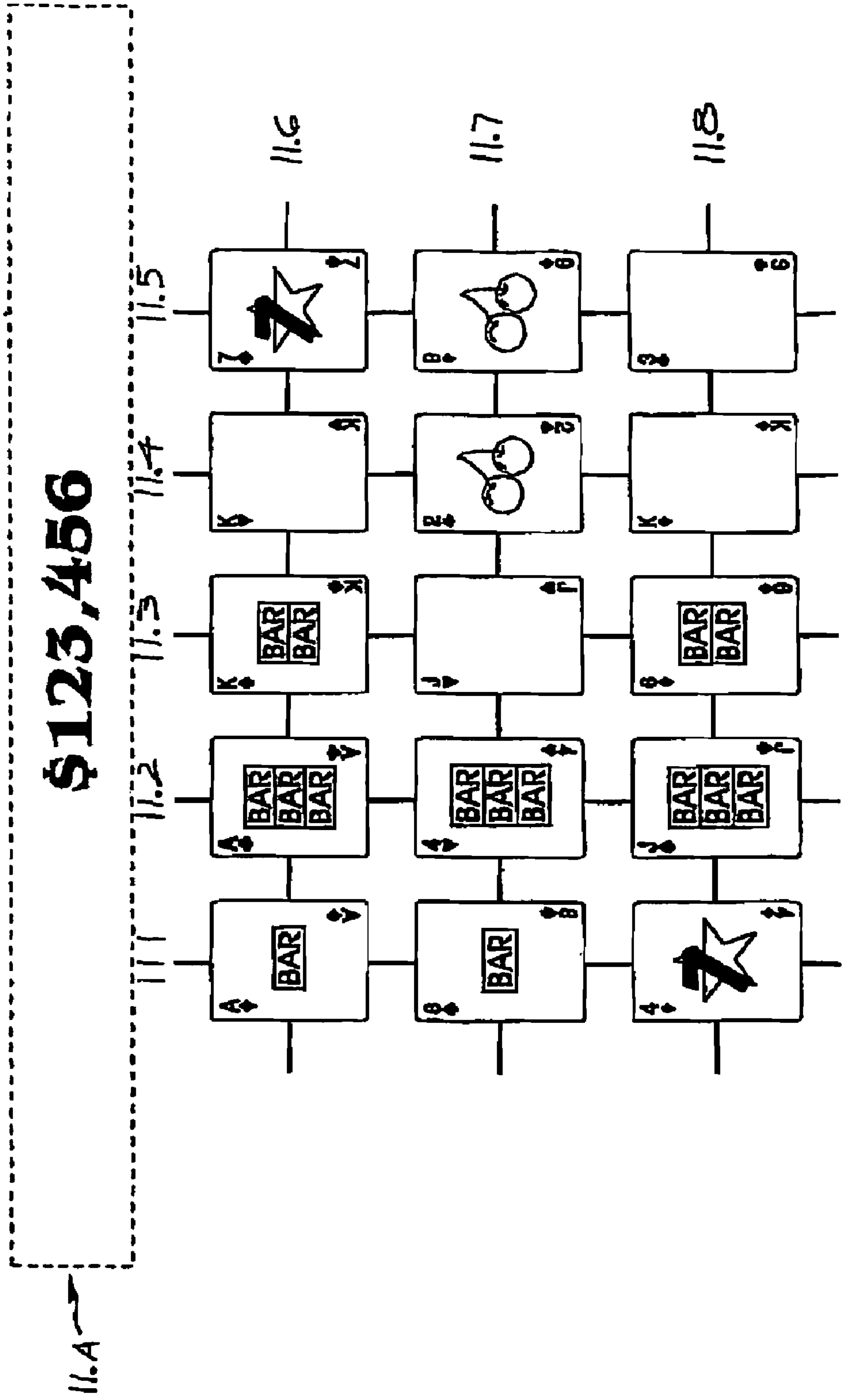
FIG. 11 is an illustration of a multi-hand video poker game using slot machine event symbols in accordance with the invention.

FIG. 11 is an illustration of an embodiment utilizing known suitable electronic video game means to enable creation and play of a video game such that 3 rows of cards are dealt upon a single video monitor. In FIG. 11 item 11.A is a progressive jackpot apparatus. Items 11.6, 11.7, and 11.8 are 3 rows each of 5 cards dealt from 3 separate apparatus with each apparatus utilizing a traditional deck of 52 cards which are each constructed utilizing the allocation criteria as detailed in Table 6B. Each card deck is randomized by the electronic video gaming means and a player places a wager preferably upon a wager area related to possible outcomes of lines pay identified as 11.1 to 11.8. Multi-line wagering games are known and this embodiment utilizes a common multi-line wager method.

Each wager made is a credit unit that enables players to place 8 credits total per wager, enabling activation of pay lines shown as 11.1 to 11.8. With each incremental wager amount an additional 1 unit is applied to each wager location that corresponds to pay lines 11.1 to 11.8. Thus, the first wager is 8, the second 16, the third would be 24, etc. and the corresponding individual wagers per line would be 1, 2, and 3, etc. respectively.

After an activating wager is placed and deal method is activated the video game apparatus deals three rows of 5 cards to each row identified by pay lines 11.6, 11.7, and 11.8. Each of the three rows of cards dealt is dealt from a different apparatus using one deck of 52 cards. Thus, rows 11.6, 11.7 and 11.8 are from three differing decks.

A player can win an award by receiving 3 winning event outcome symbols located as disclosed upon the cards dealt in each of the columns 11.1 to 11.5. An example is given in column 11.2 where a player wins upon receiving three "3 Bar" event outcome symbols upon said cards dealt. Additionally, a player can play differing variations of 5 card poker games in rows 11.6, 11.7, and 11.8 to enable an award to be won on 5 card outcomes on the 3 rows. This embodiment enables the players to play a draw poker variation.

An example of a winning hand is in row 11.6, where the player has 2 pair Aces and Kings.

In this embodiment the column awards are eligible to be won on the first dealing of the cards only. After the first deal players play draw poker and receive replacement cards for the poker hands rows 11.6, 11.7 and 11.8.

Any combination of row numbers, column numbers, and poker play variations can be played within this embodiment. Likewise, any embodiment of the invention implemented on a live table, video game, internet game, or a representation of this game upon a scratch off lottery ticket is intended to fall inside the scope of this application.

This embodiment enables the creation of a video gaming device such that players are eligible to win an award based upon two award criteria:

- a first award based in part upon a first playing card's value and/or card suit; and
- a second award based upon the first card's event outcome symbol where the first card symbol is associated with symbols from another apparatus of the invention.

An award can be calculated by comparing symbols upon one or more cards where each card is from an independent deck of cards.

Any of the aforementioned variations or any other variations of card games that utilize 5 or more cards per player can easily enable play of a simulated game of the popular dice game Yahtzee.

FIG. 12 is a score sheet from the dice game ofYahtzee. One embodiment, which is similar to that described above, enables the play of a Yahtzee game with the play of a poker game. This embodiment utilizes suitable electronic video gaming means to enable the creation of a video game play and monitor display of a 5 by 5 matrix consisting of 5 rows and 5 columns of cards as detailed in FIG. 13 which is an illustration of a preferred video display wherein item 13.A is a progressive jackpot apparatus; items 13.6, 13.7, 13.8, 13.9 and 13.10 are 5 rows each of 5 cards dealt from 5 separate apparatus, each apparatus utilizing a traditional deck of 52 cards; and wherein the decks of cards are constructed utilizing the allocation criteria as detailed in Table 7. This allocation omits placing dice symbols upon the 4 Aces. There are 8 instances of each of the 6 possible dice outcomes.

Each card deck is randomized by the electronic video gaming apparatus and a player places a wager preferably upon a wager area related to possible outcomes of lines pay identified as 13.1 to 13.10. This embodiment utilizes a common multi-line wager method.

Each wager made is a credit unit that enables players to place 10 credits total per wager, enabling activation of pay lines shown as 13.1 to 13.10. With each incremental wager amount an additional 1 unit is applied to each wager location that corresponds to pay lines 13.1 to 13.10. Thus, the first wager is 10, the second 20, the third would be 30, etc. and the corresponding individual wagers per line would be 1, 2, and 3, etc. respectively.

After an activating wager is placed and a deal method is activated the video game apparatus deals five rows of 5 cards to each row identified by pay lines 13.6, 13.7, 13.8, 13.9 and 13.10. Each of the five rows of cards dealt is dealt from a different apparatus using one deck of 52 cards. Thus, rows of cards identified by pay lines 13.6, 13.7, 13.8, 13.9 and 13.10 are all dealt from five differing decks.

This embodiment enables the players to play a draw poker variation upon the rows of cards dealt. A player can win an award in two ways. After the play of the draw poker variation is completed, the 5×5 matrix of cards will be completely filed with playing cards displayed in FIG. 12. First the player can win an award by having 5 winning event outcome symbols of dice values as disclosed upon the cards dealt in each of the columns 13.1 to 13.5. Should the combinations of dice values meet award criteria, such as is displayed in FIG. 12 for the game of Yahtzee, then the player receives an award. An example is given in column 13.1 where a player wins upon receiving five of the same dice values, each die displaying "6" upon the cards dealt.

Additionally, a player can play differing variations of 5 card poker games in rows 13.6, 13.7, 13.8, 13.9 and 13.10 to enable an award to be won on 5 card outcomes on the 5 rows of cards played. An example of a winning hand is in row 13.7, where the player has a 3 of a kind poker hand win utilizing the 3 Kings upon the cards dealt.

Any combination of rows, columns, and poker play variations can be played with this embodiment of the invention which can be implemented on a live table, video game or internet game, or a representation of this game can be implemented on a scratch-off lottery ticket.

The dice allocations upon the cards enable strategy decisions such that players must often choose between an initial poker hand win or alternatively a probable larger Yahtzee award win based upon the dice value symbols. Alternatively, the inverse is often the case whereby a player must choose to attempt to improve a poker hand at the expense of a winning Yahtzee combination.

An optional variation of this embodiment enables a means of providing a large progressive jackpot by providing one or more special symbols on one or more Aces (or other cards) in each deck of cards utilized and providing an award in any column for obtaining said 5 special symbol combinations.

Multiple hands of cards can be played from differing decks whereby a symbol other than card value and card suit on one or more cards from said one or more decks is used as an award criteria.

Players can win an award by receiving one or more winning combinations of cards based upon a combination based in part upon either the card value or the card suit and a combination based in part upon an additional symbol upon the cards.

Although the horizontal rows are used for poker hand award calculations and the vertical columns are used for event symbol outcome award calculations, any combination of rows and columns that enable an award calculation based totally or in part on a symbol upon a depiction of a playing card is possible.

U.S. Pat. No. 5,823,873 issued to Moody provides a means of playing multiple hands of cards from multiple decks. A complete description of this means is detailed in said patent and is incorporated herein for reference.

In a preferred embodiment event outcome symbols, such as slot machine symbols, are applied upon each of the independent decks utilized as in U.S. Pat. No. 5,823,873. One way of applying the invention within the scope of the patent is to enable players to be entitled to hold the symbol value, the card value, or the combined cards with symbol values. Any of the disclosed uses of the apparatus utilizing event symbols upon the playing cards can be adopted for use with the aforementioned patent.

The dice symbols upon the cards in this embodiment can utilize one or more colors of die outcome event symbols. A differing color die enables the creation of a statistically rarer event upon rolling 5 dice. For example, if 5 colors of each of the 6 die outcomes are utilized, then for one to obtain a 5 of a kind (Yahtzee) all of the same dice outcome colors would be much more statistically rare.

A progressive award could be awarded utilizing either the dice outcome symbols of value, the dice outcome symbols of color, or a combination of the two to achieve various degrees of statistics as so desired in pay table creation.

U.S. Pat. No. 6,474,649 issued to Kennedy and Price is incorporated herein by reference. Any of the principles in this application can be used in conjunction with the subject matter of this patent.

Briefly, the patent discloses apparatus for playing a card game whereby the location at a player's position at a live table or video representation thereof is used as a criterion for awarding a game award.

One embodiment of the present invention enables play upon this type of disclosed device utilizing the player station symbols in award pays.

This embodiment includes a playing surface with one or more symbols at each player station and a card apparatus with one or more playing cards, each card having a card value and a card suit. Additionally, the card apparatus is constructed such that the entire apparatus of all cards comprises one collection of all possible symbol outcomes depicting a slot machine reel. The card apparatus has an equal number of cards as predefined possible stops upon the reel. In the entire card apparatus, all cards utilized in game play are equal to the number of possible stops upon the slot reel. Preferably, the reel has numerous differing symbols and empty stop possibilities.

Thus, one card randomly selected from the apparatus would enable the display of one symbol related to one possible outcome of the stopping of the slot wheel.

Table 8 is a table detailing the possible stops of the slot wheel and all associated symbols of said events occurring represented with the same probability of chance upon the plurality of playing cards of the apparatus. In Table 8 items A, B, C, D and E are marked as the event outcomes symbols that are also used on the game table at each station location as detailed in the patent. However, the additional symbols disclosed and populated upon the cards are not utilized upon the game apparatus.

As represented in Table 8, the card apparatus contains a first set of symbols displayed upon the cards wherein first symbols are possible stops upon the slot machine reel. These symbols are chosen to be displayed also upon the playing apparatus. One of each of this first set of symbols is populated at one each of the player stations. The card apparatus contains a second set of symbols that represent the remaining possible events of the slot machine reel stopping. These events are also displayed upon the cards wherein the second set symbols are not populated upon playing apparatus.

This set of event outcomes of the slot reel symbols are all other symbols of the possible slot machine outcomes. The blank or empty positions are possible outcomes and are used in the calculation of the slot machine symbol awards calculations.

An illustration of this embodiment of a preferred table apparatus utilizing the disclosed invention is in FIG. 14. Hereafter, for illustrative purposes this embodiment is referred to as "Monopoly Blackjack". "Monopoly" is a respective third party trade mark and is used herein merely for descriptive purposes.

In FIG. 14 item 14.1 is a progressive display means; item 14.2 is a game play surface as can be used based on a casino card table, TableMAX, or another video representation; items 14.3*a* and 14.3*b* are dealer card position areas where cards are dealt in the game; item 14.4 is an award apparatus; item 14.5 is a wager for a progressive side bet; and items 14.6*a* to 14.6*e* are wager areas for a blackjack wager area. Also these are unique symbols per player station as detailed in U.S. Pat. No. 6,474,649, but this embodiment utilizes event outcome symbols of an independent game of a slot machine.

This embodiment utilizes an automated mechanical shuffler to shuffle the cards used in this game continuously. An advantage of operation of continuous shufflers is that all possible events as represented upon the cards are constantly randomized upon the conclusion of each hand play. Thus, all events are possible for most of the time.

The preferred table includes a playing surface 14.2, including a card game wagering area 14.6 which is a standard blackjack game wager area. Players place wagers here prior to cards being dealt. A wager area 14.5 enables a player to place one or more wagers upon a predetermined occurrence of slot machine symbol outcomes to be displayed. Every card in the apparatus mirrors and represents a possible stop on the slot machine reel. Thus, every card in game play has an event outcome symbol of one reel spin displayed upon the card. This preferred example enables a player to participate in a wager, placed at area 14.5, that the first two symbols received by the player will be one or more symbols that comprise a predetermined symbol combination.

U.S. Pat. No. 4,861,041 discloses a progressive side bet system that is utilized in this embodiment. However, other jackpot configurations and methods such as a fixed side bet wager are possible. As stated area 14.1 represents a separate Progressive Win meter. In a video application a progressive meter could be displayed upon the video screen.

Game play begins on the preferred apparatus with all players placing blackjack wagers in the designated blackjack wager areas 14.6*a* to 14.6*e*. After blackjack wagers are placed, players preferably have the option to place one or more progressive wagers upon the area 14.5 for a symbol win. After all wagers are placed, the dealer deals one card to each player, from the left to right of the dealer with the dealer receiving a card last in sequence. The dealer receives the first dealer card face down upon the table at the location 14.3*b*.

A second card is then dealt to each player with the dealer receiving a second card. After all players have received two cards, the dealer's second card received is dealt face up at location 14.3*a*. If a player wagers the progressive slot wager and obtains a predetermined arrangement of slot machine event outcome symbols upon the first two event symbols received, the player wins a first progressive award.

A table of awards is included in Table 8. At this point a player with a predetermined arrangement of symbols may have won an award. An example of a hand with a winning award is shown at the locations 14.6*e*, 14.6*b*, and 14.6*a*. Play of the blackjack hand does not have any effect upon the award of the progressive slot symbol play.

The game can be operated whereby players play either the card game or the slot game. Additionally, play of the slot game can commence without offering the blackjack game.

The slot event symbols displayed upon the cards are independent of any card value, card suit, or any card game. The slot symbol game is independent and does not require a predetermined arrangement of cards. The symbols can be allocated upon the cards as the cards are being dealt, or after they are dealt by electronics means. Thus, use of weighted means of allocation that apply symbols with means that generate rare statistical events can be employed. This method applies to any symbol type used with the apparatus of the invention.

The slot machine symbol game is played with the two first symbols dealt to a player. Additionally, as a jackpot means a third symbol on the dealer's hole card is utilized in the calculation of player jackpot wins. Any number of symbols, or any symbols shown in game play, can be used as a means of enabling an independent game of slot machine symbol play within the scope of this invention.

For illustration of one award, an example is detailed at locations 14.6*a* and 14.6*b*. Any award pay structure or number of event symbols as displayed upon cards in the apparatus can be utilized.

Play of the blackjack game commences with normal blackjack game rules. Each player plays his respective hand strategy receiving additional cards as desired from the dealer. At the end of play of all player hands in the game, the dealer reveals the face down card, referred to herein as the hole card located at the area 14.3*b*, to all players in the game. The hole card event symbol is utilized for the purpose of providing a random event outcome of an instance of a slot symbol event as depicted upon symbols on cards of the apparatus. This event outcome symbol is used for calculation of an award pay. If the dealer has a slot event symbol that matches a two slot symbol event at a player's location then the player wins the jackpot award as defined in Table 8.

As depicted in Table 8 and at the location 14.6*b* a player can win the jackpot award by obtaining first 2 symbols, wherein the 2 symbols of events are predefined winning symbols, and an instance of this slot event outcome symbol is displayed at the respective player station on the table apparatus. Thus, the dealer's hole event symbol 14.3*a* must contain a slot event symbol matching the player's station slot event symbol at the location 14.6*b*.

FIG. 14.2 illustrates a progressive jackpot win at player station 14.6*b*.

Continuing the game play, the dealer blackjack hand play continues with the dealer playing his hand in accordance with the rules and procedures. Upon completion of the dealer hand progressive event wagers are preferably paid first and, thereafter, blackjack game wagers are resolved.

One or more wager areas upon the table apparatus are utilized to place a wager for an award wherein the award calculation utilizes a first set of player station symbols and a plurality of playing cards which contain the first set of symbols and a second set of symbols not populated upon the player stations.

The Monopoly game can be played without the inclusion of the first set of player station symbols. In this embodiment, the player stations could have unique symbols at each player station simply for décor and all pay awards are calculated based upon the probabilities of a disclosed second set of independent outcomes of slot machine events. The game can be played with a specific event outcome symbol located at each player station.

In another preferred embodiment allied to the Monopoly game, the player stations at the apparatus can have one or more symbols that are not populated in the collection of slot event symbols represented upon the playing cards.

It is contemplated that one or more players at the player stations can choose from one or more symbols to be played at the apparatus. In this embodiment, players are not forced to have a certain play symbol but can choose to play symbols of choice.

The method and apparatus enabling a choice of station symbol can be implemented by a selectable electronic means which includes options of symbols represented in the possible outcomes as depicted via symbols upon the playing cards, additional symbols not represented, or no symbol options.

The game can randomly or through a calculation method change the event outcome symbols at the player stations during operation of a video gaming device. Additionally, players can choose event outcome symbols that are already in use by other players or the apparatus can be configured such that each station symbol must be mutually exclusive of other symbols in use at other player stations.

In another embodiment of the Monopoly game the total collection of all event possibilities and all stops upon a single slot machine reel as disclosed previously are represented upon the cards. It is possible that the outcomes could be symbols of other event outcomes such as dice, cards, roulette outcomes, etc. Thus, a first set of outcomes as detailed with the event outcomes of a slot machine reel stop could contain a second set of event outcomes being, for example, those of dice outcome values.

This subset, or an unlimited number of subsets, could be used as a factor in a calculation of the card game, a first independent game, or a second independent game of chance.

FIG. 14 is an illustration of a table with a basic operation as disclosed herein.

In Table 8 items F, G, H, I, J, and K are identified as a second set of event outcomes. These comprise a second event of a dice being rolled. These items are a subset of the overall possible events of a slot machine's possible reel stops.

In this embodiment, if a player receives 2 symbols containing said dice outcome event symbols then the player wins an award which is calculated through use of the apparatus detailed in item 14.4 in FIG. 14.

An illustration of such award criteria being met is displayed at position 14.6*a* in FIG. 14. Here a player is eligible for an award to be determined by utilizing the event symbols displayed, dice values of 4 and 3, in calculation of the movement of the award apparatus.

As represented in Table 8 the card apparatus contains a first set of events symbols, those relating to the outcome of a slot machine reel stopping, and a second subset of event outcome symbols being those related to a single die being rolled.

Two events can be introduced upon the apparatus and have a chance of occurrence. A card randomly selected from the apparatus enables random selection of a slot machine stopping, as well as possible stops that depict a second outcome of an event such as result of a die being rolled.

In this Monopoly game variation awards are calculated by the secondary apparatus 14.4 moving a position marker a number of increments equal to the dice value symbols upon the playing cards. Preferably, the award apparatus in this embodiment would contain several possible stops and be constructed to resemble and simulate a Monopoly game board.

Upon a player receiving an award hand containing dice symbol values, the award apparatus enables a position representation means to increment or advance a number of positions around the game board equal to the dice value total. The player then wins the award posted upon the final location of stopping upon the award apparatus 14.4.

The outcome of an event can be symbolically represented upon playing cards that contain both a card value and a card suit. A value derived from the event outcome occurrence is used as a means of calculation of an award.

In another embodiment of the invention, a game of Bingo is played utilizing event outcome symbols upon the playing cards as disclosed herein.

Figure 15:
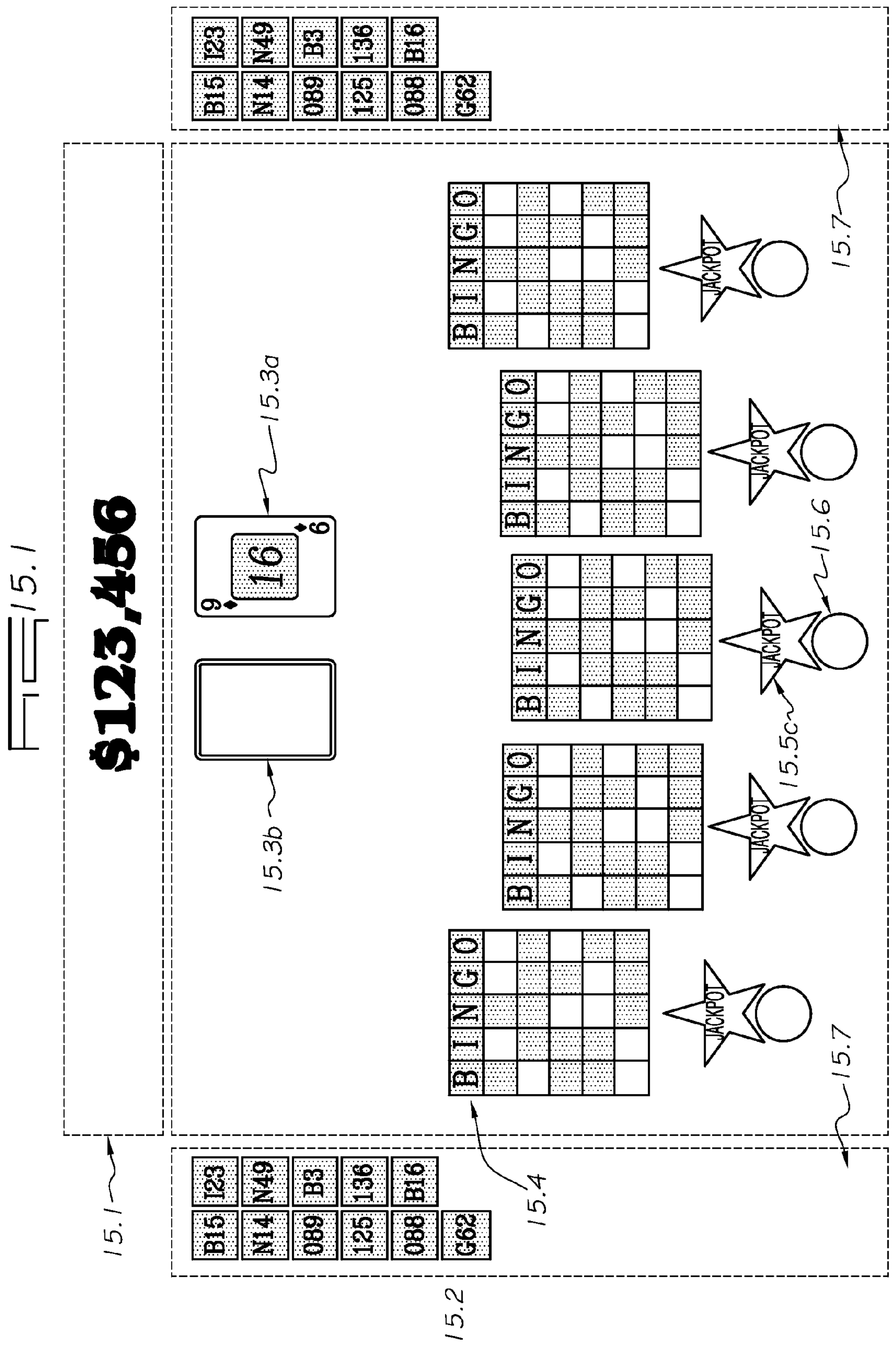
FIGS. 15.1 and 15.2 illustrate a table used to play a game of bingo using the principles of the invention.

FIG. 15 displays an apparatus used in the play of a game of Bingo whereby the Bingo numbers selected are preferably on dealer cards 15.3*a* and 15.3*b*. Area 15.4 is a depiction of preferably electronic means to play Bingo automatically upon a video version using the apparatus disclosed, preferably TableMAX.

In this embodiment, a player station recording means records occurrences of randomly selected numbers until all locations in a predetermined row or column have been marked as occurring. The player is then eligible to win an award.

Electronic means can be used to allocate the event symbols upon the cards using known weighted allocation means. For example, upon dealing the cards, a second random number generator can be used to distribute various play symbols upon the cards virtually.

Differing weighted allocation of symbols upon the cards can be done with electronic/software means. This enables the weighting of symbols displayed. In this embodiment "near miss" means could be applied as is currently done and disclosed above within the art of reel slot machines.

Additionally progressive video poker games can have minimum bet levels to enable activation of a jackpot award. It is known and common for a 5 coin video poker game to activate the progressive win award for player eligibility upon a fifth coin being wagered.

A normal deck of cards could be used for one wagering level and the disclosed "event symbol" deck could be used for a maximum wagering level. Thus, a second game is enabled upon a defined level of wager.

Upon the maximum wager, the symbol deck is utilized and the player is automatically eligible to win a jackpot that is awarded using the symbols in the calculation of the jackpot award.

In another embodiment the apparatus is utilized upon scratch-off lottery tickets. Instant lottery ticket games are known. Often these games are referred to as scratch off games as a player purchases a card and "scratches off" a surface coating that reveals underneath the outcome of certain awards.

Use is made of a represented deck of cards with dice values included upon the represented cards to create a compelling instant lottery ticket game using known scratch-off technology.

The lottery ticket game utilizes 5 rows of cards organized preferably in a 5 by 5 matrix with the columns and rows symmetrical. The game is operated such that players scratch off a first surface to reveal a second area upon the lottery card such that each of the 5 rows of cards are populated with 5 cards with one or more cards populated utilizing the disclosed outcome event symbols.

A player can win an award by receiving one or more winning combinations of either poker hand combinations or symbol combinations. The horizontal rows are used for poker hand award calculations and the vertical columns are used for symbol award calculations.

Alternatively, any combination of rows and columns that award a prize based at least in part on a symbol on a depiction of a playing card on the lottery ticket is possible.

The preferred symbol outcomes to be utilized on the lottery ticket cards are dice outcome symbols, roulette outcome symbols, lottery number outcome symbols, Keno ball outcome symbols, and card outcome symbols. However, any symbol of an event outcome of a predefined event or activity can be utilized within the scope of this invention.

Figure 13:
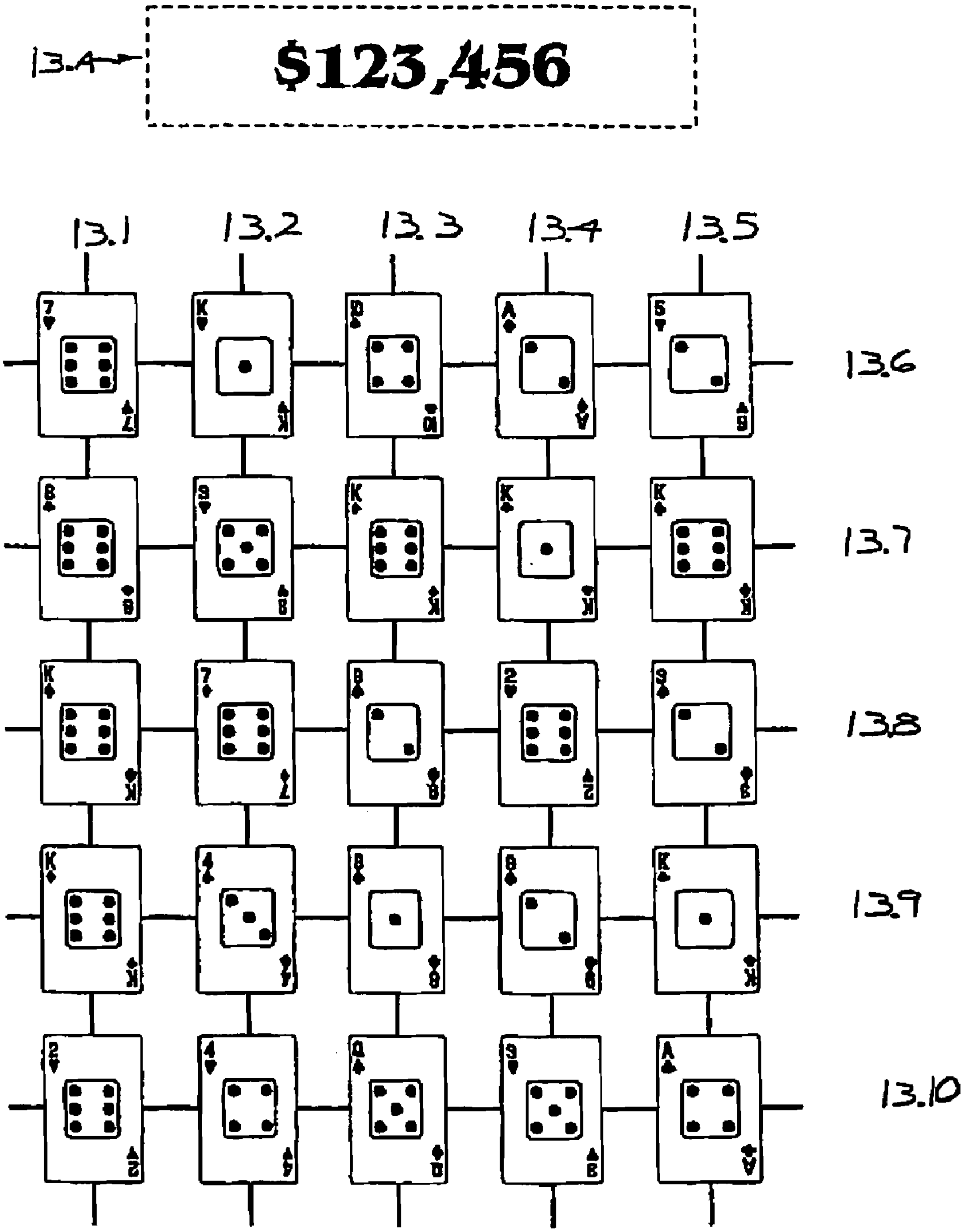
FIG. 13 is an illustration of a multi-hand video poker game incorporating a dice game of Yahtzee according to the invention.

FIGS. 11 and 13 depicting previously mentioned video screen embodiments can be utilized upon similar scratch-off lottery ticket games.

As an example using FIG. 13, the entire matrix is filled with 5 rows and 5 columns of representations of the disclosed playing cards each populated with dice symbols. Thus, there are 25 dice cards within the matrix. The entire matrix area is covered from view with a known scratch-off coating which can be removed by the purchaser of the card.

The game is played with the player, or purchaser, of the instant lottery card scratching off each of the 5 rows or 5 columns revealing cards allocated in the respective locations. Various awards can be given for combinations of either rows of 5 cards or columns of 5 cards. Each winning combination has an award. The awards include disclosed dice event symbols as well as poker combinations.

Any number of rows or columns of cards can be utilized in the present invention.

All embodiments illustrated herein are applicable to all types of card games that use playing cards including, but not limited to, live casino card games, video card games, internet games, lottery scratch ticket games, and any use of traditional playing cards.

TABLE 1

Card Event Symbol Distributions Craps Blackjack

| Card | Deck 1 | | | | Deck 2 | | | |
|---|---|---|---|---|---|---|---|---|
| Value | Spades | Hearts | Diamonds | Clubs | Spades | Hearts | Diamonds | Clubs |
| Ace | 6 | 5 | 4 | 3 | 2 | 1 | 6 | 5 |
| King | 6 | 5 | 4 | 3 | 2 | 1 | 6 | 5 |

TABLE 1-continued

| Card Event Symbol Distributions Craps Blackjack | | | | | | | | |
|---|---|---|---|---|---|---|---|---|
| Queen | 6 | 5 | 4 | 3 | 2 | 1 | 6 | 5 |
| Jack | 6 | 5 | 4 | 3 | 2 | 1 | 6 | 5 |
| 10 | 6 | 5 | 4 | 3 | 2 | 1 | 6 | 5 |
| 9 | 6 | 5 | 4 | 3 | 2 | 1 | 6 | 5 |
| 8 | 6 | 5 | 4 | 3 | 2 | 1 | 6 | 5 |
| 7 | 6 | 5 | 4 | 3 | 2 | 1 | 6 | 5 |
| 6 | 6 | 5 | 4 | 3 | 2 | 1 | 6 | 5 |
| 5 | 6 | 5 | 4 | 3 | 2 | 1 | 6 | 5 |
| 4 | 6 | 5 | 4 | 3 | 2 | 1 | 6 | 5 |
| 3 | 6 | 5 | 4 | 3 | 2 | 1 | 6 | 5 |
| 2 | 6 | 5 | 4 | 3 | 2 | 1 | 6 | 5 |
| Card | Deck 3 | | | | Deck 4 | | | |
| Value | Spades | Hearts | Diamonds | Clubs | Clubs | Spades | Hearts | Spades |
| Ace | 4 | 3 | 2 | 1 | 6 | 5 | 4 | 3 |
| King | 4 | 3 | 2 | 1 | 6 | 5 | 4 | 3 |
| Queen | 4 | 3 | 2 | 1 | 6 | 5 | 4 | 3 |
| Jack | 4 | 3 | 2 | 1 | 6 | 5 | 4 | 3 |
| 10 | 4 | 3 | 2 | 1 | 6 | 5 | 4 | 3 |
| 9 | 4 | 3 | 2 | 1 | 6 | 5 | 4 | 3 |
| 8 | 4 | 3 | 2 | 1 | 6 | 5 | 4 | 3 |
| 7 | 4 | 3 | 2 | 1 | 6 | 5 | 4 | 3 |
| 6 | 4 | 3 | 2 | 1 | 6 | 5 | 4 | 3 |
| 5 | 4 | 3 | 2 | 1 | 6 | 5 | 4 | 3 |
| 4 | 4 | 3 | 2 | 1 | 6 | 5 | 4 | 3 |
| 3 | 4 | 3 | 2 | 1 | 6 | 5 | 4 | 3 |
| 2 | 4 | 3 | 2 | 1 | 6 | 5 | 4 | 3 |
| Card | Deck 5 | | | | Deck 6 | | | |
| Value | Clubs | Diamonds | Hearts | Diamonds | Clubs | Diamonds | Hearts | Spades |
| Ace | 2 | 1 | 6 | 5 | 4 | 3 | 2 | 1 |
| King | 2 | 1 | 6 | 5 | 4 | 3 | 2 | 1 |
| Queen | 2 | 1 | 6 | 5 | 4 | 3 | 2 | 1 |
| Jack | 2 | 1 | 6 | 5 | 4 | 3 | 2 | 1 |
| 10 | 2 | 1 | 6 | 5 | 4 | 3 | 2 | 1 |
| 9 | 2 | 1 | 6 | 5 | 4 | 3 | 2 | 1 |
| 8 | 2 | 1 | 6 | 5 | 4 | 3 | 2 | 1 |
| 7 | 2 | 1 | 6 | 5 | 4 | 3 | 2 | 1 |
| 6 | 2 | 1 | 6 | 5 | 4 | 3 | 2 | 1 |
| 5 | 2 | 1 | 6 | 5 | 4 | 3 | 2 | 1 |
| 4 | 2 | 1 | 6 | 5 | 4 | 3 | 2 | 1 |
| 3 | 2 | 1 | 6 | 5 | 4 | 3 | 2 | 1 |
| 2 | 2 | 1 | 6 | 5 | 4 | 3 | 2 | 1 |

TABLE 2

Card Event Symbol Distributions Roulette 21

| Card Value | Spades | Hearts | Diamonds | Clubs | Spades | Hearts | Diamonds | Clubs |
|---|---|---|---|---|---|---|---|---|
| | Deck 1 | | | | Deck 2 | | | |
| Ace | 0 Green | 10 Black | 23 Red | 36 Red | 13 Red | 26 Black | 3 Red | 16 Red |
| King | 0 Green | 11 Black | 24 Black | 1 Red | 14 Red | 27 Red | 4 Black | 17 Black |
| Queen | 0 Green | 12 Red | 25 Red | 2 Black | 15 Black | 28 Black | 5 Red | 18 Red |
| Jack | 0 Green | 13 Black | 26 Black | 3 Red | 16 Red | 29 Black | 6 Black | 19 Red |
| 10 | 1 Red | 14 Red | 27 Red | 4 Black | 17 Black | 30 Red | 7 Red | 20 Black |
| 9 | 2 Black | 15 Black | 28 Black | 5 Red | 18 Red | 31 Black | 8 Black | 21 Red |
| 8 | 3 Red | 16 Red | 29 Black | 6 Black | 19 Red | 32 Red | 9 Red | 22 Black |
| 7 | 4 Black | 17 Black | 30 Red | 7 Red | 20 Black | 33 Black | 10 Black | 23 Red |
| 6 | 5 Red | 18 Red | 31 Black | 8 Black | 21 Red | 34 Red | 11 Black | 24 Black |

TABLE 2-continued

| Card Event Symbol Distributions Roulette 21 | | | | | | | | |
|---|---|---|---|---|---|---|---|---|
| Card Value | Spades | Hearts | Diamonds | Clubs | Spades | Hearts | Diamonds | Clubs |
| 5 | 6 Black | 19 Red | 32 Red | 9 Red | 22 Black | 35 Black | 12 Red | 25 Red |
| 4 | 7 Red | 20 Black | 33 Black | 10 Black | 23 Red | 36 Red | 13 Black | 26 Black |
| 3 | 8 Black | 21 Red | 34 Red | 11 Black | 24 Black | 4 Red | 14 Red | 27 Red |
| 2 | 9 Red | 22 Black | 35 Black | 12 Red | 25 Red | 2 Black | 15 Black | 28 Black |
| | Deck 3 | | | | Deck 4 | | | |
| Ace | 29 Black | 6 Black | 19 Red | 32 Red | 9 Red | 22 Black | 35 Black | 15 Red |
| King | 30 Red | 7 Red | 20 Black | 33 Black | 10 Black | 23 Red | 36 Red | 13 Black |
| Queen | 31 Black | 8 Black | 21 Red | 34 Red | 11 Black | 24 Black | 1 Red | 14 Red |
| Jack | 32 Red | 9 Red | 22 Black | 35 Black | 12 Red | 25 Red | 2 Black | 15 Black |
| 10 | 33 Black | 10 Black | 23 Red | 36 Red | 13 Black | 26 Black | 3 Red | 16 Red |
| 9 | 34 Red | 11 Black | 24 Black | 1 Red | 14 Red | 27 Red | 4 Black | 17 Black |
| 8 | 35 Black | 12 Red | 25 Red | 2 Black | 15 Black | 28 Black | 5 Red | 18 Red |
| 7 | 36 Red | 13 Black | 26 Black | 3 Red | 16 Red | 29 Black | 6 Black | 19 Red |
| 6 | 1 Red | 14 Red | 27 Red | 4 Black | 17 Black | 30 Red | 7 Red | 20 Black |
| 5 | 2 Black | 15 Black | 28 Black | 5 Red | 18 Red | 31 Black | 8 Black | 21 Red |
| 4 | 3 Red | 16 Red | 29 Black | 6 Black | 19 Red | 32 Red | 9 Red | 22 Black |
| 3 | 4 Black | 17 Black | 30 Red | 7 Red | 20 Black | 33 Black | 10 Black | 23 Red |
| 2 | 5 Red | 18 Red | 31 Black | 8 Black | 21 Red | 34 Red | 11 Black | 24 Black |

TABLE 2.1

| Card Event Symbol Distributions Roulette 21 | | | | | | | | |
|---|---|---|---|---|---|---|---|---|
| Card | Deck 5 | | | | Deck 6 | | | |
| Value | Spades | Hearts | Diamonds | Clubs | Spades | Hearts | Diamonds | Clubs |
| Ace | 26 Red | 2 Black | 15 Black | 28 Black | 5 Red | 18 Red | 31 Black | 8 Black |
| King | 26 Black | 3 Red | 16 Red | 29 Black | 6 Black | 19 Red | 32 Red | 9 Red |
| Queen | 27 Red | 4 Black | 17 Black | 30 Red | 7 Red | 20 Black | 33 Black | 10 Black |
| Jack | 28 Black | 5 Red | 18 Red | 31 Black | 8 Black | 21 Red | 34 Red | 11 Black |
| 10 | 29 Black | 6 Black | 19 Red | 32 Red | 9 Red | 22 Black | 35 Black | 12 Red |
| 9 | 30 Red | 7 Red | 20 Black | 33 Black | 10 Black | 23 Red | 36 Red | 13 Black |
| 8 | 31 Black | 8 Black | 21 Red | 34 Red | 11 Black | 24 Black | 1 Red | 14 Red |
| 7 | 32 Red | 9 Red | 22 Black | 35 Black | 12 Red | 25 Red | 2 Black | 15 Black |
| 6 | 33 Black | 10 Black | 23 Red | 36 Red | 13 Black | 26 Black | 3 Red | 16 Red |
| 5 | 34 Red | 11 Black | 24 Black | 1 Red | 14 Red | 27 Red | 4 Black | 17 Black |
| 4 | 35 Black | 12 Red | 25 Red | 2 Black | 15 Black | 28 Black | 5 Red | 18 Red |
| 3 | 36 Red | 13 Black | 26 Black | 3 Red | 16 Red | 29 Black | 6 Black | 19 Red |
| 2 | 1 Red | 14 Red | 27 Red | 4 Black | 17 Black | 30 Red | 7 Red | 20 Black |

TABLE 2.1-continued

Card Event Symbol Distributions Roulette 21

| Card Value | Deck 7 Spades | Hearts | Diamonds | Clubs |
|---|---|---|---|---|
| Ace | 21 Red | 34 Red | 11 Black | 24 Black |
| King | 22 Black | 35 Black | 12 Red | 25 Red |
| Queen | 23 Red | 36 Red | 13 Black | 26 Black |
| Jack | 24 Black | 1 Red | 14 Red | 27 Red |
| 10 | 25 Red | 2 Black | 15 Black | 28 Black |
| 9 | 26 Black | 3 Red | 16 Red | 29 Black |
| 8 | 27 Red | 4 Black | 17 Black | 30 Red |
| 7 | 28 Black | 5 Red | 18 Red | 31 Black |
| 6 | 29 Black | 6 Black | 19 Red | 32 Red |
| 5 | 30 Red | 7 Red | 20 Black | 33 Black |
| 4 | 31 Black | 8 Black | 21 Red | 34 Red |
| 3 | 32 Red | 9 Red | 22 Black | 35 Black |
| 2 | 33 Black | 10 Black | 23 Red | 36 Red |

TABLE 3

Roulette 21 odds and pay table

American Roulette Odds

| | | | |
|---|---|---|---|
| Outcomes: | 37 | | |
| | Red | Black | Green |
| Total Possibilities: | 18 | 18 | 1 |
| Probability: | 48.65% | 48.65% | 2.70% |
| # of each Single Number: | 1 | | |
| Probability: | 2.703% | | |

Roulette 21 Statistics

| | | | |
|---|---|---|---|
| Decks of Cards: | 7 | | |
| Outcomes: | 37 | | |
| | Red | Black | Green |
| Total Possibilities: | 180 | 180 | 4 |
| Probability: | 49.45% | 49.45% | 1.01% |
| # of each Single Number: | 10 | | |
| Probability: | 2.747% | | |
| Card Symbols of Green: | Ace, King, Queen, Jack | | |

Roulette 21 Progressive Payouts

| | Dealer's Hole Card Red/Black | Green |
|---|---|---|
| Green Blackjack | 250 | 50,000 (Jackpot Start) |
| Blackjack - 1 Green Card | 25 | 500 |
| Blackjack | 5 | 50 |
| Side Bet Wager: | $ 0.50 | |
| Average Jackpot: | $205,292 | |
| Probabilities (1 in X odds) | Dealer's Hole Card | |
| | Red/Black | Green |
| Green Blackjack | 8,809 | 1,594,393 |
| Blackjack - 1 Green Card | 442 | 79,986 |
| Blackjack | 22 | 4,063 |

TABLE 4

Card Event Symbol Distributions Dice Poker

| Card Value | Deck 1 Spades | Hearts | Diamonds | Clubs |
|---|---|---|---|---|
| Ace | 1 | 6 | 2 | 5 |
| King | 6 | 1 | 6 | 1 |
| Queen | 5 | 2 | 5 | 2 |

TABLE 4-continued

Card Event Symbol Distributions Dice Poker

| Card Value | Deck 1 Spades | Hearts | Diamonds | Clubs |
|---|---|---|---|---|
| Jack | 4 | 3 | 4 | 3 |
| 10 | 3 | 4 | 3 | 4 |
| 9 | 2 | 5 | 2 | 5 |
| 8 | 1 | 6 | 1 | 6 |
| 7 | 6 | 1 | 6 | 1 |
| 6 | 5 | 2 | 5 | 2 |
| 5 | 4 | 3 | 4 | 3 |
| 4 | 3 | 4 | 3 | 4 |
| 3 | 2 | 5 | 2 | 5 |
| 2 | 1 | 6 | 1 | 6 |

Dice event outcome symbols in Matrix

TABLE 5

Dice Poker Pay Table 5.1 Dice Poker

| Hand | Payouts | |
|---|---|---|
| Royal flush | 1000 to 1 | |
| Straight flush | 200 to 1 | |
| 5 of a Kind (Dice) | 100 to 1 | (A) |
| Four of a kind | 50 to 1 | |
| Full House | 11 to 1 | |
| Flush | 8 to 1 | |
| 4 of a kind (dice) | 6 to 1 | (B) |
| Straight | 5 to 1 | |
| Three of a kind | 3 to 1 | |
| Two pair | 2 to 1 | |
| Pair of 10's or Better | 1 to 1 | |
| Hit Ratio: 24.10% | | |
| Payback: 98.73% | | |

5.2 Let it Ride Poker example

| Hand | Payouts |
|---|---|
| Royal flush | 1000 to 1 |
| Straight flush | 200 to 1 |
| Four of a kind | 50 to 1 |
| Full House | 11 to 1 |
| Flush | 8 to 1 |
| Straight | 5 to 1 |

TABLE 5-continued

| Dice Poker Pay Table | |
|---|---|
| Three of a kind | 3 to 1 |
| Two pair | 2 to 1 |
| Pair of 10's or Better | 1 to 1 |
| Hit Ratio: 23.88% | |
| Payback: 96.72% | |

5.3 Dice Value Qualification

| Hand | Payouts | |
|---|---|---|
| Royal flush | 1000 to 1 | |
| Straight flush | 100 to 1 | |
| 5 of a Kind (Dice) | 50 to 1 | |
| Four of a kind | 25 to 1 | |
| Full House | 12 to 1 | |
| Flush | 10 to 1 | |
| 4 of a kind (dice) | 8 to 1 | |
| Straight | 7 to 1 | |
| Three of a kind | 3 to 1 | |
| Two pair | 2 to 1 | |
| Pair of 9's or Better | 1 to 1 | (C) |
| Dealer Qualifies with an 8 or Better Dice Value | | |
| Payback: 98.58% | | |

5.4 Dice Outcome Probabilities

| Outcome | Probabilities |
|---|---|
| 1 | 100.00% |
| 2 | 100.00% |
| 3 | 100.00% |
| 4 | 99.54% |
| 5 | 98.15% |
| 6 | 95.37% |
| 7 | 90.74% |
| 8 | 83.80% |
| 9 | 74.07% |
| 10 | 62.50% |
| 11 | 50.00% |
| 12 | 37.50% |
| 13 | 25.93% |
| 14 | 16.20% |
| 15 | 9.26% |
| 16 | 4.63% |
| 17 | 1.85% |
| 18 | 0.46% |

Results of rolling 3 Dice and getting outcome or better

TABLE 6

Card Distributions Slot Cards Video Poker

A Slot Machine Reel Stops: 26

| Symbol | Reel 1 | Reel 2 | Reel 3 | Probability |
|---|---|---|---|---|
| 7 | 1 | 1 | 1 | 0.000057 |
| 3 Bar | 3 | 3 | 3 | 0.001536 |
| 2 Bar | 4 | 4 | 4 | 0.003641 |
| 1 Bar | 6 | 6 | 6 | 0.012289 |
| Cherry | 5 | 5 | 5 | 0.007112 |
| Empty | 7 | 7 | 7 | 0.019515 |
| Total | 26 | 26 | 26 | 1.000000 |

| Symbol | Prob. | Pay | | Return |
|---|---|---|---|---|
| 7 | 0.000057 | 1000 | | 0.056896 |
| 3 Bar | 0.001536 | 250 | | 0.384046 |
| 2 Bar | 0.003641 | 50 | | 0.182066 |
| 1 Bar | 0.012289 | 25 | | 0.307237 |
| 3 Cherries | 0.007112 | 7 | | 0.049784 |
| Empty | 0.019515 | 0 | | 0 |
| | | | Payback: | 98.00% |

TABLE 6-continued

Card Distributions Slot Cards Video Poker

B Card Deck Apparatus of Slot Machine Event Outcomes
Slot Machine Reel Stops: 26
Cards in Deck: 52

| Symbol | Deck 1 | Deck 2 | Deck 3 | Probability |
|---|---|---|---|---|
| 7 | 2 | 2 | 2 | 0.000057 |
| 3 Bar | 6 | 6 | 6 | 0.001536 |
| 2 Bar | 8 | 8 | 8 | 0.003641 |
| 1 Bar | 12 | 12 | 12 | 0.012289 |
| Cherry | 10 | 10 | 10 | 0.007112 |
| Empty | 14 | 14 | 14 | 0.019515 |
| Total | 52 | 52 | 52 | 1.000000 |

| Symbol | Prob. | Pay | | Return |
|---|---|---|---|---|
| 7 | 0.000057 | 1000 | | 0.056896 |
| 3 Bar | 0.001536 | 250 | | 0.384046 |
| 2 Bar | 0.003641 | 50 | | 0.182066 |
| 1 Bar | 0.012289 | 25 | | 0.307237 |
| 3 Cherries | 0.007112 | 7 | | 0.049784 |
| Empty | 0.019515 | 0 | | 0 |
| | | | Payback: | 98.00% |

TABLE 7

Card Event Symbol Distributions Yahtzee Video Poker

| | Deck 1 | | | |
|---|---|---|---|---|
| Card Value | Spades | Hearts | Diamonds | Clubs |
| Ace | Not Used | Not Used | Not Used | Not Used |
| King | 6 | 1 | 6 | 1 |
| Queen | 5 | 2 | 5 | 2 |
| Jack | 4 | 3 | 4 | 3 |
| 10 | 3 | 4 | 3 | 4 |
| 9 | 2 | 5 | 2 | 5 |
| 8 | 1 | 6 | 1 | 6 |
| 7 | 6 | 1 | 6 | 1 |
| 6 | 5 | 2 | 5 | 2 |
| 5 | 4 | 3 | 4 | 3 |
| 4 | 3 | 4 | 3 | 4 |
| 3 | 2 | 5 | 2 | 5 |
| 2 | 1 | 6 | 1 | 6 |

Dice event outcome symbols in Matrix

TABLE 8

Card Distributions & Pay Table Monopoly Blackjack
Slot Machine Reel Stops: 52
Cards in Apparatus: 156

| | Symbol | Slot Stops | Card w/Events |
|---|---|---|---|
| A | Car | 1 | 3 |
| B | Hat | 1 | 3 |
| C | Shoe | 1 | 3 |
| D | Boat | 1 | 3 |
| E | Dog | 1 | 3 |
| F | Dice 1 | 3 | 9 |
| G | Dice 2 | 3 | 9 |
| H | Dice 3 | 3 | 9 |
| I | Dice 4 | 3 | 9 |
| J | Dice 5 | 3 | 9 |
| K | Dice 6 | 3 | 9 |
| | BoardWalk | 4 | 12 |
| | Park Place | 4 | 12 |

TABLE 8-continued

| Card Distributions & Pay Table Monopoly Blackjack<br>Slot Machine Reel Stops: 52<br>Cards in Apparatus: 156 | | |
|---|---|---|
| Water Works | 4 | 12 |
| Railroad | 4 | 12 |
| Chance | 4 | 12 |
| Empty | 9 | 27 |
| Total | 52 | 156 |

| Hand Combination | Win |
|---|---|
| Station Symbols & Match Dealer | Jackpot |
| Station Symbols | $5,000 |
| Boardwalk | $2,500 |
| Park Place | $1,000 |
| Water Works | $500 |
| Railroad | $250 |
| Chance | $100 |
| Dice values | Free Spin |

What is claimed is:

1. An electronic video game apparatus that is configured to facilitate simultaneous play of at least first and second independent games of chance that generate independent outcomes, said electronic video game apparatus comprising:

a video display;

at least one electronic random number generator; and electronic means for carrying out the steps of:

allowing a player to wager upon a baccarat card game;

allowing a player to place one or more separate wagers upon one or more dice roll outcomes of a dice game;

employing said at least one random number generator to randomly select one or more playing cards in said baccarat card game, each of said playing cards including a suit value and a card value;

employing said at least one random number generator to randomly select one or more outcomes of said dice game;

dealing one or more of said playing cards to a player hand and to a dealer hand by displaying on said video display electronic representations of said one or more outcomes of said dice game upon electronic representations of said one or more playing cards in said baccarat card game playing a card game of baccarat;

settling wagers on said baccarat card game; and settling wagers on said dice game by using an electronically generated dice roll outcome representation on said at least one card dealt in said baccarat card game on said video display as a criteria for calculating an award of said wagers upon one or more dice roll outcomes in said dice game.

2. The electronic video game apparatus of claim 1, wherein a player wins a dice game wager if the player's hand sum total value of all said dice representations on cards dealt to said player hand is greater than or equal to 2.

3. The electronic video game apparatus of claim 1, wherein a player wins a dice game wager if the dealer's hand sum total value of all said dice representations on cards dealt to said dealer hand is greater than or equal to 2.

4. The electronic video game apparatus of claim 1, wherein a baccarat card game wager is required before allowing a player to place one or more said dice wagers.

5. The electronic video game apparatus of claim 4, wherein said dice outcome wager includes a progressive jackpot feature.

6. The electronic video game apparatus of claim 1, wherein said dice game outcome representations are displayed on said electronic representations of said baccarat game playing cards on said video display only if a predetermined wager level upon said baccarat card game has been wagered by a player.

7. The electronic video game apparatus of claim 1, wherein said dice outcome representations utilize die of more than one color.

8. An electronic video game apparatus that is configured to facilitate simultaneous play of at least first and second independent games of chance that generate independent outcomes, said video game apparatus comprising:

a video display;

at least one electronic random number generator; and electronic means for carrying out the steps of:

allowing a player to wager on an outcome of a poker card game;

employing said at least one random number generator to randomly select one or more playing cards in said poker card game, each of said playing cards including a suit value and a card value;

employing said at least one random number generator to randomly select one or more outcomes of a lottery number draw game;

dealing one or more of said playing cards face up by displaying upon said video display electronic representations of said one or more playing cards in said poker game, said electronic representations of said one or more cards each including a suit value, a card value and also having at least one electronic representation of a lottery number draw outcome for said lottery number draw game superimposed on said card;

dealing at least one community common card face down by displaying on said video display electronic representations of a back side of said at least one community common card;

allowing a player to wager further on an outcome of said poker card game;

displaying on said video display a face side of said at least one community common card, thereby providing a hand for each player comprising said at least one community common card and the cards each player was dealt; and utilizing said lottery number draw outcome representation (s) on said at least one community common card to determine an award calculation in said poker card game.

9. The electronic video game apparatus of claim 8, wherein said poker card game wager includes a progressive jackpot feature.

10. The electronic video game apparatus of claim 8, wherein there are exactly three community common cards.

11. The electronic video game apparatus of claim 8, wherein said poker game is stud poker.

12. The electronic video game apparatus of claim 8, wherein said poker game is draw poker.

13. The electronic video game apparatus of claim 8, wherein said lottery number draw outcome representation(s) utilized upon said one or more playing cards in said card game, also enable a player to be eligible for a future lottery draw.

14. An electronic video game apparatus that is configured to facilitate simultaneous play of at least first and second independent games of chance that generate independent outcomes, said electronic video game apparatus comprising:

a video display;

at least one electronic random number generator; and electronic means for carrying out the steps of:

allowing a player to wager upon a blackjack card game;

allowing a player to place one or more separate wagers upon one or more dice roll outcomes of a dice game;

employing said at least one random number generator to randomly select one or more playing cards in said blackjack card game, each of said playing cards including a suit value and a card value;

employing said at least one random number generator to randomly select one or more outcomes of said dice game;

dealing one or more of said playing cards to a player hand and to a dealer hand by displaying on said video display electronic representations of said one or more outcomes of said dice game upon electronic representations of said one or more playing cards in said blackjack card game playing a card game of blackjack;

settling wagers on said blackjack card game; and settling wagers on said dice game by using an electronically generated dice roll outcome representation on said at least one card dealt in said blackjack card game on said video display as a criteria for calculating an award of said wagers upon one or more dice roll outcomes in said dice game.

15. The electronic video game apparatus of claim 14, wherein a player wins a dice game wager if the player's hand sum total value of all said dice representations on cards dealt to said player hand is greater than or equal to 2.

16. The electronic video game apparatus of claim 14, wherein a player wins a dice game wager if the dealer's hand sum total value of all said dice representations on cards dealt to said dealer hand is greater than or equal to 2.

17. The electronic video game apparatus of claim 14, wherein a blackjack card game wager is required before allowing a player to place one or more said dice wagers.

18. The electronic video game apparatus of claim 17, wherein said dice outcome wager includes a progressive jackpot feature.

19. The electronic video game apparatus of claim 14, wherein said dice game outcome representations are displayed on said electronic representations of said blackjack game playing cards on said video display only if a predetermined wager level has been wagered by a player upon said blackjack card game.

20. The electronic video game apparatus of claim 14, wherein said dice outcome representations utilize die of more than one color.

* * * * *